(12) United States Patent
Katami et al.

(10) Patent No.: US 10,538,055 B2
(45) Date of Patent: Jan. 21, 2020

(54) POLARIZING FILM LAMINATE HAVING TRANSPARENT ADHESIVE LAYER, AND DISPLAY PANEL

(71) Applicant: NITTO DENKO CORPORATION, Ibaraki-shi, Osaka (JP)

(72) Inventors: Hirofumi Katami, Ibaraki (JP); Atsushi Yasui, Ibaraki (JP)

(73) Assignee: NITTO DENKO CORPORATION, Ibaraki-shi, Osaka (JP)

( * ) Notice: Subject to any disclaimer, the term of this patent is extended or adjusted under 35 U.S.C. 154(b) by 142 days.

(21) Appl. No.: 15/569,244

(22) PCT Filed: Jul. 20, 2016

(86) PCT No.: PCT/JP2016/071301
§ 371 (c)(1),
(2) Date: Oct. 25, 2017

(87) PCT Pub. No.: WO2017/014242
PCT Pub. Date: Jan. 26, 2017

(65) Prior Publication Data
US 2018/0319127 A1    Nov. 8, 2018

(30) Foreign Application Priority Data

Jul. 22, 2015  (JP) ................................. 2015-145287

(51) Int. Cl.
*B32B 7/02* (2019.01)
*C09J 11/04* (2006.01)
(Continued)

(52) U.S. Cl.
CPC .................. *B32B 7/02* (2013.01); *B32B 7/12* (2013.01); *C09J 7/20* (2018.01); *C09J 11/04* (2013.01);
(Continued)

(58) Field of Classification Search
CPC ....... B32B 7/02; B32B 7/12; B32B 2307/412; G02B 5/30; C09J 7/38; C09J 7/20; C09J 11/04; C09J 201/00
(Continued)

(56) References Cited

U.S. PATENT DOCUMENTS 9,477,354 B2    10/2016  Hao et al.
9,631,126 B2    4/2017   Lee et al.
(Continued)

FOREIGN PATENT DOCUMENTS

JP    5169644 A       6/1976
JP    2000-338329 A   12/2000
(Continued)

OTHER PUBLICATIONS

Singapore Search Report dated Dec. 12, 2017 in connection with the counterpart Singapore Patent Application No. 11201708473T.
(Continued)

*Primary Examiner* — Nathanael R Briggs
*Assistant Examiner* — William D Peterson
(74) *Attorney, Agent, or Firm* — Hauptman Ham, LLP

(57) ABSTRACT

Provided is a polarizing film laminate comprising a pressure-sensitive adhesive layer, and a polarizing film wherein the adhesive layer comprises: a base adhesive zone made of a transparent base pressure-sensitive adhesive material and formed over a given range from one principal surface of the adhesive layer in a thickness direction of the adhesive layer; and a refractive index adjustment zone formed over a given range from the other principal surface of the adhesive layer in the thickness direction and comprising the base pressure-sensitive adhesive material and material infiltrated into the base pressure-sensitive adhesive material and different from the base pressure-sensitive adhesive material, the refractive index adjustment zone having an average refractive index
(Continued)

greater than a refractive index of the base pressure-sensitive adhesive material, and wherein the base pressure-sensitive adhesive material zone of the pressure-sensitive adhesive layer is located on the side of the polarizing film.

33 Claims, 16 Drawing Sheets

(51) Int. Cl.
    *C09J 201/00*     (2006.01)
    *G02B 5/30*     (2006.01)
    *C09J 7/20*     (2018.01)
    *B32B 7/12*     (2006.01)

(52) U.S. Cl.
    CPC .............. *C09J 201/00* (2013.01); *G02B 5/30* (2013.01); *B32B 2307/412* (2013.01)

(58) Field of Classification Search
    USPC .......................................................... 349/96
    See application file for complete search history.

(56) References Cited

U.S. PATENT DOCUMENTS

| | | | |
|---|---|---|---|
| 2002/0098352 A1* | 7/2002 | Kishioka | ............... C08F 220/30 428/352 |
| 2013/0154473 A1 | 6/2013 | Kaneko et al. | |
| 2014/0138131 A1 | 5/2014 | Hao et al. | |
| 2016/0084991 A1 | 3/2016 | Umemoto et al. | |
| 2016/0115357 A1 | 4/2016 | Katami et al. | |
| 2016/0130478 A1 | 5/2016 | Nagata et al. | |
| 2016/0200949 A1 | 7/2016 | Lee et al. | |
| 2017/0062629 A1* | 3/2017 | Chiu | ................. H01L 31/02168 |

FOREIGN PATENT DOCUMENTS

| | | | |
|---|---|---|---|
| JP | 2003-131032 A | 5/2003 |
| JP | 2005-105228 A | 4/2005 |
| JP | 4640740 B2 | 3/2011 |
| JP | 4751481 B1 | 8/2011 |
| JP | 2012-073563 A | 4/2012 |
| JP | 5520752 B2 | 6/2014 |
| JP | 5564748 B2 | 8/2014 |
| WO | 2010/100917 A | 9/2012 |
| WO | 2014/208695 A1 | 12/2014 |
| WO | 2015/031246 A1 | 3/2015 |
| WO | 2015/108159 A1 | 7/2015 |
| WO | 2015/108160 A1 | 7/2015 |

OTHER PUBLICATIONS

Japanese Office Action dated Jan. 30, 2017, from JPO in connection with the counterpart Japanese Patent Application No. 2015-145287.
International Search Report dated Oct. 11, 2016 corresponding to International Application No. PCT/JP2016/071301.

\* cited by examiner

FIG.9(a)

| |
|---|
| HC-TAC 28 μm |
| Polarizer 23 μm |
| Acrylic-based film 20 μm |
| Base adhesive zone (1) 1.49 |
| Refractive index adjustment zone 1.66 |
| ITO 1.85 |
| Glass substrate 1.53 |
| Evaluation black PET |

FIG.9(b)

| |
|---|
| HC-TAC 28 μm |
| Polarizer 23 μm |
| Acrylic-based film 20 μm |
| Pressure-sensitive adhesive layer A 1.49 |
| ITO 1.85 |
| Glass substrate 1.53 |
| Evaluation black PET |

FIG.10(a)

| |
|---|
| ARC-TAC 43 μm |
| Polarizer 12 μm |
| Acrylic-based film 20 μm |
| Base adhesive zone (2) 1.48 |
| Refractive index adjustment zone 1.75 |
| ITO 1.85 |
| Glass substrate 1.53 |
| Evaluation black PET |

FIG.10(b)

| |
|---|
| ARC-TAC 43 μm |
| Polarizer 12 μm |
| Acrylic-based film 20 μm |
| Pressure-sensitive adhesive layer B1 1.48 |
| ITO 1.85 |
| Glass substrate 1.53 |
| Evaluation black PET |

Embedding resin

Adhesive

Embedding resin

Nanoparticle layer

POLARIZING FILM LAMINATE HAVING TRANSPARENT ADHESIVE LAYER, AND DISPLAY PANEL

CROSS REFERENCE TO RELATED APPLICATION

This present application is a national stage filing under 35 U.S.C § 371 of PCT application number PCT/JP2016/071301 filed on Jul. 20, 2016 which is based upon and claims the benefit of priority to Japanese Patent Application No. 2015-145287 filed on Jul. 22, 2015 in the Japanese Intellectual Property Office. The disclosures of the above-listed applications are hereby incorporated by reference herein in their entirety.

TECHNICAL FIELD

The present invention relates to a polarizing film laminate comprising a transparent pressure-sensitive adhesive layer. In particular, the present invention relates to a polarizing film laminate comprising a transparent pressure-sensitive adhesive layer usable for bonding a transparent optical element to another optical element.

BACKGROUND ART

A display device such as a liquid crystal display device or an organic EL display device (OLED) uses a polarizing film together with a retardation film, a transparent cover element such as a cover glass, and various other transparent optical elements, wherein a pressure-sensitive adhesive is required to bond the polarizing film to another optical element including an element substrate located at a viewing-side surface of a display panel. That is, a pressure-sensitive adhesive layer is disposed between the polarizing film and another optical element, and then the two optical elements are pressed against each other and bonded together through the pressure-sensitive adhesive layer to thereby form a polarizing film laminate. Such a polarizing film laminate is used together with a display device such as a liquid crystal display device or an organic EL display device, and disposed on a viewing side with respect to the display device. In this configuration, there is a problem that, when outside light enters from the transparent optical element which is disposed on the viewing-side, the entered light is reflected at an interface between the pressure-sensitive adhesive layer and another optical element which is disposed on a non-viewing side, and returned to the viewing side. This problem becomes prominent particularly when an entry angle of outside light is relatively large.

On the other hand, in a touch panel-equipped display device which has been increasingly becoming popular in late years, a transparent electroconductive layer such as a patterned ITO (Indium Tin Oxide) layer is formed on a surface of another optical element, i.e., a bonding-target optical element to which a transparent optical element is to be bonded. In this type of display device, the problem "poor pattern invisibility" is pointed out that a pattern of the transparent electroconductive layer becomes visible from the viewing side, under the influence of internal reflection of entered light at an interface between a pressure-sensitive adhesive layer and the transparent electroconductive layer.

In each case, the internal reflection is caused by a difference in refractive index between the pressure-sensitive adhesive layer and each of the bonding-target optical element and the transparent electroconductive layer. JP 4640740 B (Patent Document 1) teaches a technique for addressing this problem. Specifically, the Patent Document 1 discloses a pressure-sensitive adhesive composition capable of reducing total reflection of light at an interface between a transparent optical element and a pressure-sensitive adhesive layer and at the interface between the pressure-sensitive adhesive layer and a bonding-target optical element. The composition disclosed in the Patent Document 1 is allegedly described as having a high refractive index in its dried and/or cured states, wherein it is close to refractive indexes of the transparent optical element and the bonding-target optical element body. The teaching of the Patent Document 1 is that a pressure-sensitive adhesive layer for bonding two optical elements together is entirely formed to have a refractive index close to refractive indexes of the two optical elements.

The technique taught by the Patent Document 1 would be effective in suppressing the interface reflection. On the other hand, there is a problem that the composition itself becomes costly, because this technique is based on the use of a particular monomer component.

JP 5564748 B (Patent Document 2) discloses a refractive index-adjusted pressure-sensitive adhesive which comprises a transparent base pressure-sensitive adhesive material comprised of an acrylic-based resin, and zirconium oxide or titanium oxide particles having an average dispersed particle size of 1 nm to 20 nm, wherein the zirconium oxide or titanium oxide particles are dispersed over the entire thickness of the transparent base pressure-sensitive adhesive material. In this pressure-sensitive adhesive, the zirconium oxide or titanium oxide particles as a high refractive index material are mixed with the transparent base pressure-sensitive adhesive material. Thus, it is considered that a refractive index of a layer of the pressure-sensitive adhesive can be increased in its entirety to thereby suppress the aforementioned interface reflection. However, the technique disclosed in the Patent Document 2 requires the use of a large amount of the high refractive index material. This causes a concern about deterioration in properties required as a pressure-sensitive adhesive, and a problem of an increase in cost. Moreover, the high refractive index material used in the Patent Document 2 is particles of an inorganic material. Thus, there is another problem that the particles are hardly dispersed, causing whitish haze due to light scattering. In this regard, it is conceivable to use particles of an organic material. In this case, however, it becomes difficult to solve a problem of coloration.

With a view to improving the technique disclosed in the Patent Document 2, JP 5520752 B (Patent Document 3) proposes coating, with a polymer, metal oxide particles to be dispersed in a pressure-sensitive adhesive. The teaching of the Patent Document 3 is that, although the pressure-sensitive adhesive layer in the Patent Document 2 has a problem of deterioration in adherence property thereof because the metal oxide particles are exposed to a surface of the pressure-sensitive adhesive layer, this problem can be solved by coating the metal oxide particles with a polymer. The technique proposed by the Patent Document 3 could have a potential to improve the adherence property of the pressure-sensitive adhesive layer to some extent. However, it cannot solve most of the remaining problems pointed out in connection with the Patent Document 2. In particular, the technique described in the Patent Document 3 is based on coating the metal oxide particles with a particular polymer. Thus, the resulting pressure-sensitive adhesive becomes more costly than that in the Patent Document 2.

CITATION LIST

Patent Document

Patent Document 1: JP 4640740 B
Patent Document 2: JP 5564748 B
Patent Document 3: JP 5520752 B

SUMMARY OF INVENTION

Technical Problem

It is a primary object of the present invention to provide a polarizing film laminate which comprises a pressure-sensitive adhesive layer capable of being produced easily and at low cost, and effectively suppressing internal reflection when used for bonding of the polarizing film laminate.

Solution to Technical Problem

In brief, the present invention is directed to forming, over a given range from a surface of a pressure-sensitive adhesive layer in its thickness direction, a refractive index adjustment zone having a refractive index greater than that of a base pressure-sensitive adhesive material of the pressure-sensitive adhesive layer, whereby, when the pressure-sensitive adhesive layer is used for bonding optical elements together, internal reflection in a laminate of these optical elements is suppressed so as to achieve the above object.

According to one aspect of the present invention, there is provided a polarizing film laminate comprising a pressure-sensitive adhesive layer, and a polarizing film on a principal surface of the pressure-sensitive adhesive layer. The pressure-sensitive adhesive layer comprises: a base adhesive zone made essentially of a transparent base pressure-sensitive adhesive material and formed over a given range from one principal surface of the pressure-sensitive adhesive layer in a thickness direction of the pressure-sensitive adhesive layer; and a transparent, adherent, refractive index adjustment zone formed over a given range from the other principal surface of the pressure-sensitive adhesive layer in the thickness direction, wherein the refractive index adjustment zone has a refractive index greater than a refractive index of the base pressure-sensitive adhesive material, and wherein the base pressure-sensitive adhesive material zone of the pressure-sensitive adhesive layer is located on the side of the polarizing film.

Preferably, the refractive index adjustment zone preferably has a thickness of 20 nm to 600 nm. In one embodiment of the first aspect of the present invention, the refractive index adjustment zone may be formed by dispersing, in a pressure-sensitive adhesive material identical to the base pressure-sensitive adhesive material, particles of a high refractive index material having a refractive index greater than that of the pressure-sensitive adhesive material, to thereby increase an average refractive index of the refractive index adjustment zone. In this embodiment, the refractive index of the high refractive index material particles is preferably in the range of 1.60 to 2.74. Preferably, the high refractive index material has an average primary particle size of 3 to 100 nm as measured by TEM observation. The high refractive index material may be one or more compounds selected from the group consisting of $TiO_2$, $ZrO_2$, $CeO_2$, $Al_2O_3$, $BaTiO_3$, $Nb_2O_5$ and $SnO_2$.

In one embodiment of the first aspect of the present invention, the other principal surface of the refractive index adjustment zone may be formed such that it has a region on which the high refractive index material particles are partially exposed, and a matrix region on which the pressure-sensitive adhesive material of the refractive index adjustment zone is partially exposed. In this case, the region on which the high refractive index material particles are exposed is preferably formed in an area ratio of 30 to 99%. Further, a difference between the refractive index of the high refractive index material particles and the refractive index of the base pressure-sensitive adhesive material is preferably in the range of 0.15 to 1.34.

Preferably, the pressure-sensitive adhesive layer has a total light transmittance of 80% or more. The high refractive index material particles may partially exist in the form of an aggregate arising from aggregation of two or more thereof.

Preferably, the refractive index adjustment zone has a thickness of 20 nm to 600 nm. The refractive index adjustment zone may be formed by dispersing, in a pressure-sensitive adhesive material identical to the base pressure-sensitive adhesive material, particles of a high refractive index material having a refractive index greater than that of the pressure-sensitive adhesive material, whereby an average refractive index of the refractive index adjustment zone is increased by the high refractive index material particles. In this case, the refractive index of the base pressure-sensitive adhesive material is preferably set in the range of 1.40 to 1.55, and the refractive index of the high refractive index material particles is preferably set in the range of 1.60 to 2.74. A bonding surface of the refractive index adjustment zone bonded to an optical element is formed such that it has a region where the high refractive index material particles are in contact with the optical element, and a matrix region where the pressure-sensitive adhesive material of the refractive index adjustment zone is in contact with the optical element. In this case, the region where the high refractive index material particles are in contact with the optical element is preferably formed in an area ratio of 30 to 99%. Further, a difference between the refractive index of the high refractive index material particles and the refractive index of the base pressure-sensitive adhesive material is preferably in the range of 0.15 to 1.34.

The refractive index adjustment zone may be formed by adding, to a pressure-sensitive adhesive material identical to the base pressure-sensitive adhesive material, an organic material having a refractive index greater than that of the pressure-sensitive adhesive material, in the form of particle, polymer or oligomer, to thereby increase an average refractive index of the refractive index adjustment zone. In the case where the pressure-sensitive adhesive layer having this feature is applied to the polarizing film laminate where the transparent electro conductive layer is formed on an optical element, the refractive indexes of the transparent electro-conductive layer, the base pressure-sensitive adhesive material and the organic material are, respectively, in the range of 1.75 to 2.14, in the range of 1.40 to 1.55 and in the range of 1.59 to 2.04. Examples of the high refractive index organic material usable herein include, but are not particularly limited to, a resin having an aromatic ring such as a styrene-based resin, and a resin containing a heteroatom such as a sulfur atom or a nitrogen atom (e.g., a polymer containing a thiol or triazine ring). Further, examples of the particles include nanometer-size organic nanoparticles and nanometer-size spherical macromolecules. Preferably, such particles have an average primary particle size of 3 nm to 100 nm as measured by TEM observation.

The pressure-sensitive adhesive layer preferably has a total light transmittance of 80% or more. The high refractive index material particles may partially exist in the form of an aggregate arising from aggregation of two or more thereof. Generally, the refractive index adjustment zone exists with irregular depths in the thickness direction of the pressure-sensitive adhesive layer.

In one embodiment of the present invention, the polarizing film laminate is attached to an antistatic (transparent electrode) layer used with a liquid crystal cell to form a liquid crystal panel, and formed on a viewing-side principal surface of the liquid crystal cell so as to prevent uneven display due to static electrification. In this case, the refractive index of the refractive index adjustment zone is less than a refractive index of the antistatic layer. For example, this antistatic layer is formed as a tin oxide-containing indium oxide (ITO) having a refractive index of about 1.85. In this case, the refractive index of the base pressure-sensitive adhesive material is in the range of 1.40 to 1.55, and the refractive index of the refractive index adjustment zone is in the range of 1.50 to 1.80. As a material for the antistatic layer, it is possible to use an organic material such as poly(3,4-ethylenedioxythiophene)-poly(styrene sulfonate (PEDOT/PSS), and copper or silver nanowires.

According to another aspect of the present invention, there is provided a liquid crystal panel comprising: the aforementioned polarizing film laminate; a liquid crystal cell; and an antistatic layer formed on a viewing-side principal surface of the liquid crystal cell. In this liquid crystal panel, the other principal surface of the pressure-sensitive adhesive layer defined by the refractive index adjustment zone thereof in the polarizing film laminate is attached to the antistatic layer. Preferably, in this liquid crystal panel, the antistatic layer is made of indium tin oxide, wherein the refractive index of the base pressure-sensitive adhesive material is in the range of 1.40 to 1.55, and the refractive index of the refractive index adjustment zone is in the range of 1.50 to 1.80.

According to yet another aspect of the present invention, there is provided a liquid crystal panel comprising: the aforementioned polarizing film laminate; a liquid crystal cell; and a transparent electroconductive layer formed on a viewing-side principal surface of the liquid crystal cell and patterned so as to function as a touch sensor by itself or in cooperation with the liquid crystal cell. In this liquid crystal panel, the other principal surface of the pressure-sensitive adhesive layer defined by the refractive index adjustment zone thereof in the polarizing film laminate is attached to the viewing-side principal surface of the liquid crystal display cell through the transparent electroconductive layer. In one embodiment, the refractive index of the refractive index adjustment zone is preferably set to be less than a refractive index of the transparent electroconductive layer. For example, when the transparent electroconductive layer is made of indium tin oxide, it is preferable that the viewing-side principal surface of the liquid crystal cell is defined by a glass substrate, wherein the refractive index of the refractive index adjustment zone is in the range of 1.60 to 1.80.

The above polarizing film laminate may further comprise a second pressure-sensitive adhesive layer on one surface of the polarizing film on a side opposite to the first pressure-sensitive adhesive layer. According to still another aspect of the present invention, there is provided a display panel comprises: this polarizing film laminate; a display cell composed of a liquid crystal cell or an organic EL cell; a viewing-side surface-defining element substrate; and a transparent electroconductive layer formed on a principal surface of the viewing-side surface-defining element substrate and patterned so as to function as a touch sensor. In this display panel, the other principal surface of the pressure-sensitive adhesive layer defined by the refractive index adjustment zone thereof is attached to the transparent electroconductive layer and the principal surface of the viewing-side surface-defining element substrate, and the second pressure-sensitive adhesive layer is laminated to the display cell. In this case, the refractive index of the refractive index adjustment zone is preferably set to be less than a refractive index of the transparent electroconductive layer, for example, in the range of 1.60 to 1.80. Further, the viewing-side surface-defining element substrate may be composed of a transparent element substrate. The transparent element substrate may be composed of a glass or transparent resin substrate, and may be formed in a single-layer structure or a composite structure composed of several elements. In particularly, a glass substrate having excellent transmittance is preferable.

In the polarizing film laminate comprising the second pressure-sensitive adhesive layer on one surface of the polarizing film on the side opposite to the first pressure-sensitive adhesive layer, the second pressure-sensitive adhesive layer may comprise: a base adhesive zone made essentially of a transparent base pressure-sensitive adhesive material and formed over a given range from one principal surface of the second pressure-sensitive adhesive layer in a thickness direction of the second pressure-sensitive adhesive layer; and a transparent, adherent, refractive index adjustment zone formed over a given range from the other principal surface of the second pressure-sensitive adhesive layer in the thickness direction, wherein the refractive index adjustment zone has a refractive index greater than a refractive index of the base pressure-sensitive adhesive material. In this case, the base pressure-sensitive adhesive material zone of the second pressure-sensitive adhesive layer is located on the side of the polarizing film. According to yet still another aspect of the present invention, there is provided a liquid crystal panel comprises: this polarizing film laminate; a liquid crystal cell; an antistatic layer formed on the liquid crystal cell; a viewing-side surface-defining element substrate; and a transparent electroconductive layer formed a principal surface of on the viewing-side surface-defining element substrate and patterned so as to function as a touch sensor. In this liquid crystal panel, the other principal surface of the first pressure-sensitive adhesive layer defined by the refractive index adjustment zone thereof is attached to the principal surface of the viewing-side surface-defining element substrate through the transparent electroconductive layer, and the other principal surface of the second pressure-sensitive adhesive layer defined by the refractive index adjustment zone thereof is laminated to the antistatic layer. Further, the viewing-side surface-defining element is composed of a transparent element substrate. In this case, the refractive index of the refractive index adjustment zone of the second pressure-sensitive layer may be set to be less than the refractive index of the transparent electroconductive layer. For example, when the transparent electroconductive layer is made of indium tin oxide, the refractive index of the refractive index adjustment zone of the first pressure-sensitive adhesive layer is preferably set in the range of 1.60 to 1.80, and, when the antistatic layer is made of indium tin oxide, the refractive indexes of the base pressure-sensitive adhesive material and the refractive index adjustment zone of the second pressure-sensitive adhesive layer are preferably set in the range of 1.40 to 1.55 and in the range of 1.50 to 1.85, respectively. As a material for the antistatic layer, it is possible to use an organic material such as poly(3,4-ethylenedioxythiophene)-poly(styrene sulfonate (PEDOT/PSS), and copper or silver nanowires.

For example, when a pressure-sensitive adhesive sheet comprising the pressure-sensitive adhesive layer for use in the present invention is used to bond a polarizing film to an optical element having a patterned transparent electroconductive layer, so as to form a touch sensor, the pressure-sensitive adhesive layer is peeled off from a support (backing), and positionally adjusted such that one surface of the pressure-sensitive adhesive layer defined by the transparent, adherent, refractive index adjustment zone faces the patterned transparent electroconductive layer and the optical element, and the other surface of the pressure-sensitive adhesive layer faces the polarizing film. Then, the refractive index adjustment zone is boded to the patterned transparent electroconductive layer and the optical element, and the other surface of the pressure-sensitive adhesive layer is bonded to the polarizing film, wherein the refractive index adjustment zone comes into contact with both of the transparent electroconductive layer and the optical element so as to fill up a stepped space between the transparent electroconductive layer and the optical element, whereby reflected light resulting from reflection of external light entering through the polarizing film, at an interface between the base pressure-sensitive adhesive layer and the refractive index adjustment zone, and reflected light resulting from reflection of the external light at an interface between the refractive index adjustment zone and the transparent electroconductive layer, are at least partially cancelled out by means of optical interference. In this case, the refractive index of the refractive index adjustment zone of the first pressure-sensitive adhesive layer is less than the refractive index of the transparent electroconductive layer, and the refractive index of the refractive index adjustment zone of the second pressure-sensitive adhesive layer is less than the refractive index of the antistatic layer.

Thus, when the polarizing film laminate according to the present invention is used to suppress such internal reflection, it is possible to at least partially cancel out reflected light resulting from reflection of entered external light at an interface between a zone made essentially of the base pressure-sensitive adhesive material and the refractive index adjustment zone in the pressure-sensitive adhesive layer, and reflected light resulting from reflection of the external light at an interface between the refractive index adjustment zone and an optical element including an element substrate on a viewing-side surface of a display panel, by means of optical interference.

Effect of Invention

In the present invention, the refractive index adjustment zone having a refractive index greater than the refractive index of the base pressure-sensitive adhesive material is formed over a given range from the other principal surface of the pressure-sensitive adhesive layer in the thickness direction. Thus, when the polarizing film is bonded to a second optical element using the pressure-sensitive adhesive sheet in the present invention, the refractive index adjustment zone as a high refractive index region makes it possible to adjust a difference in refractive index with respect to the second optical element, thereby preventing reflection at an interface between the pressure-sensitive adhesive layer and the second optical element. Further, in the configuration where the patterned transparent electroconductive layer is formed on an optical element, the present invention makes it possible to adjust the refractive index of the refractive index adjustment zone in the pressure-sensitive adhesive layer, with respect to the refractive indexes of the transparent electroconductive layer and the optical element, to thereby suppress the interface reflection. It also becomes possible to significantly reduce reflected light which would otherwise be returned toward the polarizing film, by the canceling-out effect based on a phase difference between respective ones of reflected light at the transparent electroconductive layer, reflected light at a surface of a second optical element and reflected light arising inside the pressure-sensitive adhesive layer.

BRIEF DESCRIPTION OF DRAWINGS

FIG. 9(a) is schematic diagram depicting a configuration of a polarizing film laminate in Inventive Example 1.

FIG. 9(b) is schematic diagram depicting a configuration of a polarizing film laminate in Comparative Example 1.

FIG. 10(a) is schematic diagram depicting a configuration of a polarizing film laminate in Inventive Example 2.

FIG. 10(b) is schematic diagram depicting a configuration of a polarizing film laminate in Comparative Example 2.

DESCRIPTION OF EMBODIMENTS

Although the present invention will now be described based on embodiments thereof in connection with the drawings, it should be understood that the present invention is not limited to the embodiments, but various changes and modifications may be made therein without departing from the spirit and scope thereof as set forth in appended claims. Further, in each Example, part(s) and % mean weight part(s) (parts by weight) and weight % (% by weight), respectively, and, unless otherwise specified, room temperature storage conditions consist of 23° C. and 65% R.H.

Figure 1A:
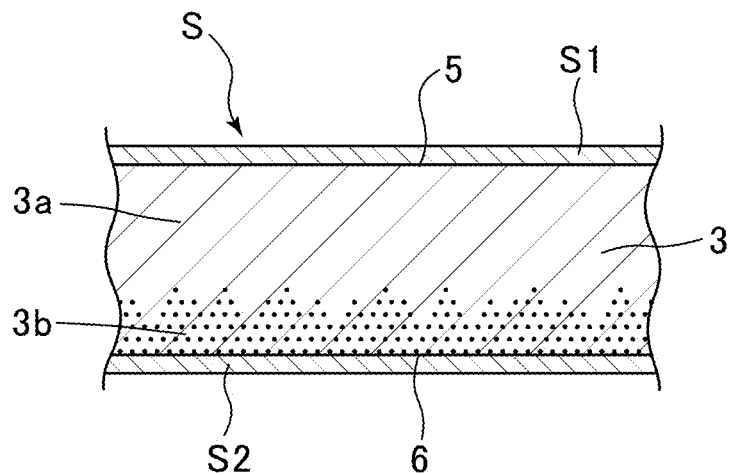
FIG. 1(a) is a sectional view depicting a pressure-sensitive adhesive sheet according to one embodiment of the present invention.
Figure 1B:
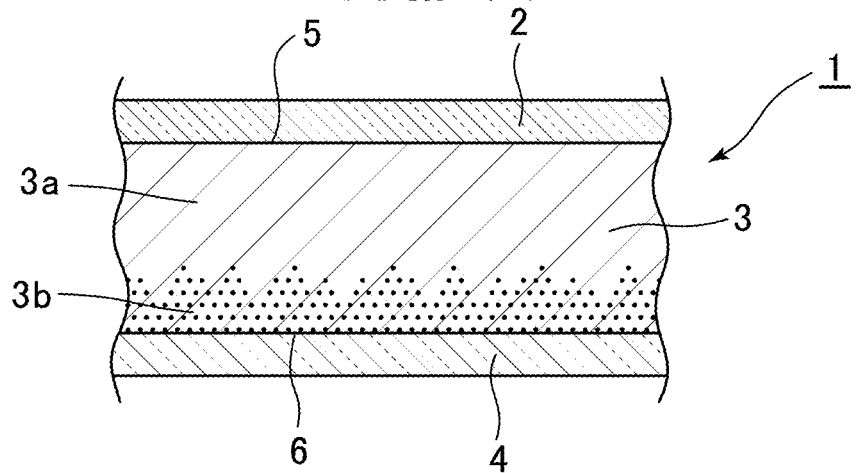
FIG. 1(b) is a sectional view depicting a simplest example of an optical element laminate as the simplest embodiment of the present invention, which is produced using the pressure-sensitive adhesive sheet in FIG. 1(a).

FIG. 1(a) is a sectional view depicting a pressure-sensitive adhesive sheet usable in one embodiment of the present invention, and FIG. 1(b) is a sectional view depicting a simplest example of an optical element laminate according to one embodiment of the present invention, which is produced using the pressure-sensitive adhesive sheet in FIG. 1(a). Referring to FIG. 1(a), a pressure-sensitive adhesive sheet S according to one embodiment of the present invention comprises: an optically transparent pressure-sensitive adhesive layer 3; a first support S1 composed of a separator laminated to one principal surface of the pressure-sensitive adhesive layer 3; and a second support S2 composed of a separator laminated to the other principal surface of the pressure-sensitive adhesive layer 3. Referring to FIG. 1(b), the optical element laminate 1 comprises a polarizing film 2, and a second optical element 4 bonded to the polarizing film 2 through an optically transparent pressure-sensitive adhesive layer 3. The optical element laminate 1 is obtained by peeling off the supports S1, S2 from the pressure-sensitive adhesive sheet S depicted in FIG. 1(a), and laminating one surface of the pressure-sensitive adhesive layer 3 from which the support S1 has been peeled off and the other surface of the pressure-sensitive adhesive layer 3 from which the support S2 has been peeled off, respectively, to a polarizing film and a desired second optical element. The second optical element 4 may be composed of an optical film for use in an optical display device, such as a retardation film, a transparent cover element for use in an optical display device, such as a viewing-side cover glass, or an element substrate disposed on a viewing side of a display panel. The polarizing film 2 and the second optical element 4 are bonded, respectively, to a first principal surface 5 and a second principal surface 6 of the pressure-sensitive adhesive layer 3.

The transparent pressure-sensitive adhesive layer 3 comprises a base adhesive zone 3a made essentially of a base pressure-sensitive adhesive material, and a refractive index adjustment zone (IM zone) 3b having a refractive index greater than that of the base adhesive zone 3a. Preferably, the refractive index of the base pressure-sensitive adhesive material of the base adhesive zone 3a is close to the refractive index of the polarizing film 2. For example, a difference between the refractive index of the polarizing film 2 and the refractive index of the base pressure-sensitive adhesive material falls preferably within 0.3, more preferably, within 0.1.

The base pressure-sensitive adhesive material is not particularly limited, as long as it is a transparent adherent material usable in optical applications. For example, it is possible to use one or more appropriately selected from the group consisting of an acrylic-based pressure-sensitive adhesive, a rubber-based pressure-sensitive adhesive, a silicone-based pressure-sensitive adhesive, a polyester-based pressure-sensitive adhesive, a urethane-based pressure-sensitive adhesive, an epoxy-based pressure-sensitive adhesive, and a polyether-based pressure-sensitive adhesive. From the viewpoint of transparency, processability, durability, etc., it is preferable to use an acrylic-based pressure-sensitive adhesive. As the base pressure-sensitive adhesive material, the above pressure-sensitive adhesives may be used independently or in the form of a combination of two or more of them. An acrylic-based polymer to be used as a base polymer of an acrylic-based pressure-sensitive adhesive is preferably, but not particularly limited to, a homopolymer or copolymer of monomers comprising a primary component consisting of (meth)acrylic acid alkyl ester. It should be noted that the term "(meth)acrylic" is used herein to mean either one or both of "acrylic" and "methacrylic", and this definition is also applied to the following description. In this specification, the term "acrylic-based polymer" is used to mean that it may include the above (meth)acrylic acid alkyl ester, and any other monomer copolymerizable with the (meth)acrylic acid alkyl ester. Generally, the refractive index of the base pressure-sensitive adhesive material is in the range of 1.40 to 1.55.

Although a thickness of the pressure-sensitive adhesive layer 3 is not particularly limited, it is set, typically, in the range of 5 μm to 500 μm, preferably, in the range of 5 μm to 400 μm, more preferably, in the range of 5 μm to 300 μm.

In the pressure-sensitive adhesive layer 3, a thickness of the refractive index adjustment zone 3b is set, preferably, in the range of 20 nm to 600 nm, more preferably, in the range of 20 nm to 300 nm, furthermore preferably, in the range of 20 nm to 200 nm. A boundary between the refractive index adjustment zone 3b and the base adhesive zone 3a is formed as an irregular undulating curve. In this specification, the thickness of the refractive index adjustment zone 3b is determined by averaging a plurality of measurement values of a depth of the undulation. A thickness of the base adhesive zone 3a is derived by subtracting the thickness of the refractive index adjustment zone 3b from the thickness of the pressure-sensitive adhesive layer 3. As measured according to JIS K7361, a total light transmittance of the entire pressure-sensitive adhesive layer 3 is 80% or more, preferably, 90% or more. The higher total light transmittance of the pressure-sensitive adhesive layer 3 provides the better results. Further, a haze value of the pressure-sensitive adhesive layer 3 is preferably 1.5% or less, more preferably, 1% or less.

Various additives may be added to the pressure-sensitive adhesive layer 3 for use in the present invention. For example, it is preferable to add any of various silane coupling agents to improve adhesion under high-temperature and high-humidity conditions. The silane coupling agent also has an effect of imparting a cohesion force which acts to improve durability of a pressure-sensitive adhesive. It is also preferable to add a cross-linking agent to the pressure-sensitive adhesive layer for use in the present invention, because the cross-linking agent can impart a cohesion force associated with durability of a pressure-sensitive adhesive. Further, it is possible to use, as needed basis, viscosity modifier, release regulator, tackifier, plasticizer, softener, filler composed of an inorganic powder, colorant (pigment, dye, etc.), pH adjuster (acid or base), rust inhibitor, antioxidant and ultraviolet absorber.

The pressure-sensitive adhesive layer may be formed by, but not particularly limited to, a method comprising: applying the base pressure-sensitive adhesive material on any of various element substrates (a separator film, a transparent resin film, etc.); drying the applied base pressure-sensitive adhesive material by a dryer such as a thermal oven, to vaporize a solvent or the like and thereby form a matrix material-based pressure-sensitive adhesive layer; and transferring the matrix material-based pressure-sensitive adhesive layer onto a polarizing film or a substrate of a liquid crystal cell, or a method comprising applying the base pressure-sensitive adhesive material directly onto a polarizing film or liquid crystal cell to form a matrix material-based pressure-sensitive adhesive layer thereon.

Then, the refractive index adjustment zone 3b can be formed, for example, by applying a solution of a resin material having a refractive index greater than that of the base pressure-sensitive adhesive material onto one surface of the matrix material-based pressure-sensitive adhesive layer formed of the base pressure-sensitive adhesive material, and then subjecting the resulting pressure-sensitive adhesive layer to drying. Examples of the resin material usable for this purpose include a pressure-sensitive adhesive composition described in the Patent Document 1. Alternatively, it is possible to employ a technique of: dispersing, in the form of a solid, an organic material having a refractive index greater than that of the base pressure-sensitive adhesive material, such as styrene oligomer, in a dispersion medium to prepare a dispersion liquid; applying the dispersion liquid to a surface of a layer of the base pressure-sensitive adhesive material (matrix material-based pressure-sensitive adhesive layer); and subjecting the resulting pressure-sensitive adhesive layer to drying. However, in the present invention, it is preferable to employ a technique of causing particles of a high refractive index material to infiltrate into the matrix material-based pressure-sensitive adhesive layer made of the base pressure-sensitive adhesive material, from the one surface thereof, whereby the high refractive index material particles are dispersed in a region of the matrix material-based pressure-sensitive adhesive layer adjacent to the one surface, as described later in connection with FIG. 2.

Figure 2:
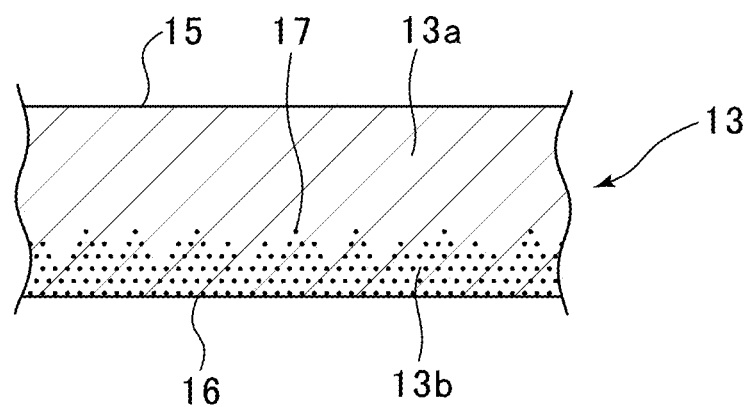
FIG. 2 is a sectional view depicting one example of a pressure-sensitive adhesive layer for use in a pressure-sensitive adhesive sheet of the present invention.

With reference to FIG. 2, a configuration of a pressure-sensitive adhesive layer 13 as one example of a pressure-sensitive adhesive layer for use in the present invention will be described in detail below.

As with the pressure-sensitive adhesive layer 3 in the pressure-sensitive adhesive sheet depicted in FIG. 1(a) and FIG. 1(b), the pressure-sensitive adhesive layer 13 depicted in FIG. 2 has a first principal surface 15 and a second principal surface 16, and comprises a base adhesive zone 13a made essentially of a base pressure-sensitive adhesive material, and a refractive index adjustment zone 13b having a refractive index greater than that of the base adhesive zone 13a. In this example, the refractive index adjustment zone 13b is formed such that it contains particles 17 of a high refractive index material which are caused to infiltrate into a layer of the base pressure-sensitive adhesive material from the second principal surface 16, and dispersed in the matrix material-based pressure-sensitive adhesive layer, over a given depth in a thickness direction of the matrix material-based pressure-sensitive adhesive layer, to thereby have a refractive index greater than that of the base adhesive zone 13a.

Preferably, a refractive index of the high refractive index material particles 17 in the refractive index adjustment zone 13b is in the range of 1.6 to 2.7. Further, for example, a difference between the refractive index of the high refractive index material particles and the refractive index of the base pressure-sensitive adhesive material is preferably in the range of 0.2 to 1.3. In the case where the refractive index adjustment zone is formed by impregnating a part of the matrix material-based pressure-sensitive adhesive layer with an organic material having a refractive index greater than that of the base pressure-sensitive adhesive material, a difference between the refractive index of the organic material and the refractive index of the base pressure-sensitive adhesive material is preferably set in the range of 0.1 to 0.6. From a viewpoint of compatibility with the base pressure-sensitive adhesive material (risks of bleed-out under low temperatures and segregation under high temperatures), and from a viewpoint of durability under high temperature or high temperature and high humidity, it is preferable to use an inorganic high refractive index material which generally has heat resistance greater than that of an organic material. Examples of a high refractive index material usable in this example where high refractive index material particles are used in the refractive index adjustment zone include $TiO_2$, $ZrO_2$, $CeO_2$, $Al_2O_3$, $BaTiO_2$, $Nb_2O_5$ and $SnO_2$, and one or more compounds selected from them can be used to form the high refractive index material particles 17. The high refractive index material particles 17 may be set to have an average primary particle size of 3 nm to 100 nm, and distributed in the refractive index adjustment zone 13b in an individually dispersed state or in a partially aggregated state. As described in connection with FIG. 1, a boundary between the refractive index adjustment zone 13b and the base adhesive zone 13a is formed as an irregular undulating curve. In a thickness measurement for the refractive index adjustment zone 13b, a depth at each of a plurality of measurement positions in a region where 90% of the high refractive index material particles 17 exist is determined as a thickness measurement value, and the measurement values at the plurality of measurement positions are averaged to obtain a thickness of the refractive index adjustment zone 13b.

Figure 3:
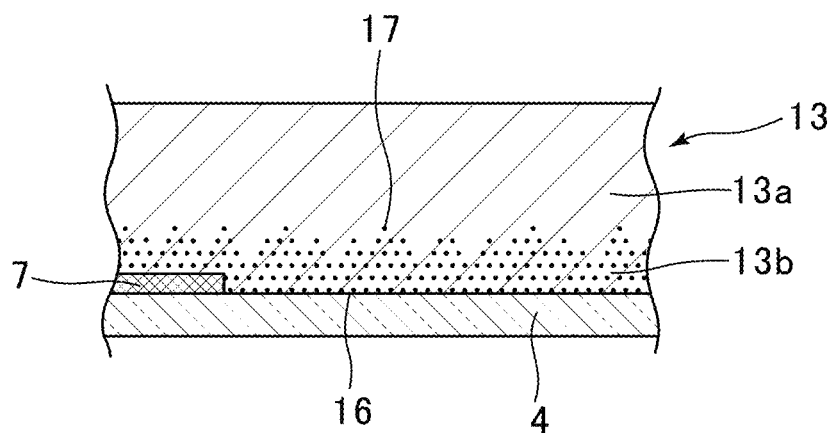
FIG. 3 is a sectional view depicting one example where the pressure-sensitive adhesive layer 13 depicted in FIG. 2 is applied to an optical element formed with a patterned transparent electroconductive layer.

FIG. 3 is a sectional view depicting one example where the pressure-sensitive adhesive layer 13 depicted in FIG. 2 is applied to a configuration in which a patterned transparent electroconductive layer 7 such as a patterned ITO film is formed on a surface of a second optical element 4 on the side of the pressure-sensitive adhesive layer 13 so as to form a touch panel sensor. In this case, examples of the second optical element 4 may include a glass substrate of a display panel, for example, in a liquid crystal display device or an organic EL display device.

A material forming the transparent electroconductive layer 7 is not particularly limited, and it is possible to use a metal oxide of at least one metal selected from the group consisting of indium, tin, zinc, gallium, antimony, titanium, silicon, zirconium, magnesium, aluminum, gold, silver, copper, palladium and tungsten. The metal oxide may further contain a metal atom presented in the above group as necessary. For example, it is preferable to use indium oxide (ITO, indium tin oxide) containing tin oxide, tin oxide containing antimony, or the like. Among them, ITO is particularly preferable. More preferably, ITO contains 80 to 99 weight % of indium oxide and 1 to 20 weight % of tin oxide. The ITO may be crystalline ITO or may be amorphous ITO. For example, the crystalline ITO can be obtained by subjecting ITO to sputtering under high temperatures to form amorphous ITO, and further heating the amorphous ITO so as to cause crystallization. Although a thickness of the transparent electroconductive layer 7 is not particularly limited, it is preferably set to 7 nm or more, more preferably, 12 to 200 nm, furthermore preferably, 12 to 100 nm, particularly preferably, 18 to 70 nm. If the thickness of the transparent electroconductive layer 7 is less than 7 nm, the transparent electroconductive layer 7 is not evenly attached in plane, so that it is likely that a resistance value in plane becomes unstable, or a desired resistance value fails to be obtained. On the other hand, if the thickness of the transparent electroconductive layer 7 is greater than 200 nm, the transparent electroconductive layer 7 tends to undergo deterioration in productivity, increase in cost, and deterioration in optical properties. A method for forming the transparent electroconductive layer 7 is not limited to the aforementioned sputtering process, but any of various processes may be employed. Specific examples thereof may include a vacuum vapor deposition process and an ion plating process. Among them, an appropriate process may be selectively employed according to a required thickness. Further, as a material for the transparent electroconductive layer 7, it is also possible to use an organic material such as poly(3,4-ethylenedioxythiophene)-poly(styrene sulfonate (PEDOT/PSS).

As a material for the transparent electroconductive layer 7, it is possible to employ a metal nanowire and a metal mesh. The metal nanowire means an electroconductive substance which is made of a metal and formed in a needle-like or thread-like shape having a nanometer size in diameter. Each metal nanowire has a nanometer size and is thereby invisible. On the other hand, a transparent electroconductive layer can be formed by arranging a plurality of metal nanowires to keep down an electrical resistance value. The metal nanowire may be linear or may be curved. When a transparent electroconductive layer composed of metal nanowires is used, the metal nanowires are formed into a mesh shape. Thus, even in the case where an amount of metal nanowires is relatively small, it is possible to form a good electrical conduction path and obtain a transparent electroconductive film having a relatively small electrical resistance. Further, the metal nanowires are formed into a mesh shape, so that openings are formed between mesh intervals. This makes it possible to obtain a transparent electroconductive film having a high light transmittance. Any appropriate metal may be used as a metal forming the metal nanowire, as long as the metal has high electroconductivity. Examples of the metal forming the metal nanowire include silver, gold, copper, and nickel. Further, it is possible to use a material obtained by subjecting each of the metals to plating (such as gold plating). Among them, from a viewpoint of electroconductivity, silver, copper, or gold is preferable and silver is more preferable.

The transparent electroconductive layer containing a metal mesh is obtained by forming a thin metal wire into a lattice pattern, on the aforementioned element substrate laminate. The metal mesh may be made of the same metal as that forming the aforementioned metal nanowire. The transparent electroconductive layer containing the metal mesh can be formed by any appropriate method. For example, the transparent electroconductive layer can be obtained by applying a photosensitive composition (composition for forming a transparent electroconductive layer) containing a silver salt onto the element substrate laminate, and then subjecting the resulting element substrate laminate to light exposure and developing to form the thin metal wire into a given pattern.

Figure 4:
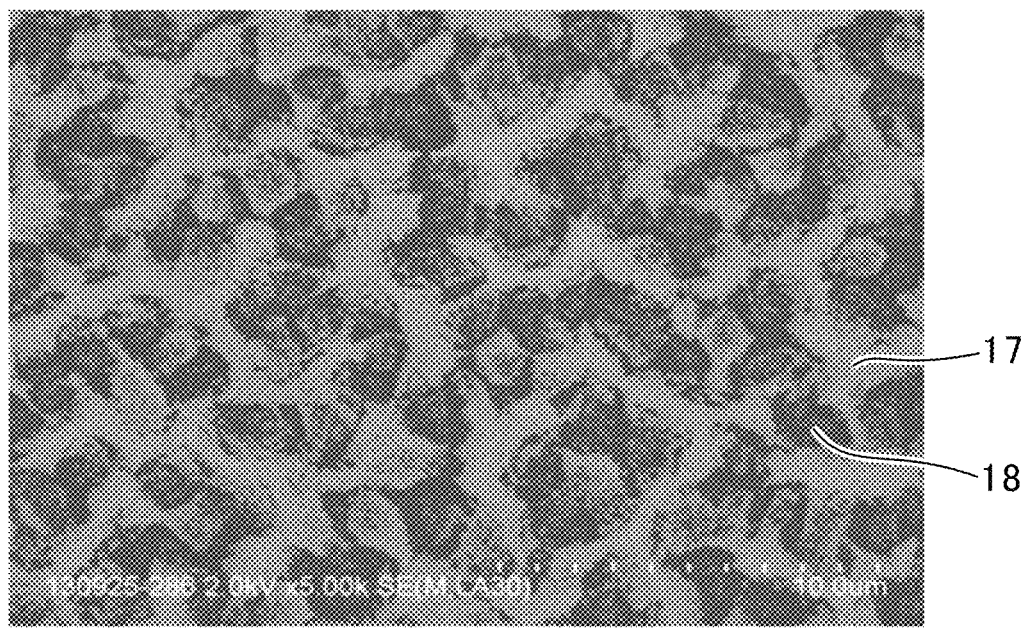
FIG. 4 is a top plan view depicting a state of a principal surface of the pressure-sensitive adhesive layer which is in contact with a second optical element.

As depicted in FIG. 3, the second principal surface 16 of the refractive index adjustment zone 13b of the pressure-sensitive adhesive layer 13 is bonded to respective pressure-sensitive adhesive layer-side surfaces of the second optical element 4 and the transparent electroconductive layer 7 in such a manner as to fill up a stepped space between the second optical element 4 and the transparent electroconductive layer 7. FIG. 4 is a top plan view depicting a state of the second principal surface 16 of the pressure-sensitive adhesive layer 13 in contact with the second optical element 4. As depicted in FIG. 4, a microstructure of the principal surface 16 is formed in a sea-island structure where the high refractive index material particles 17 are dispersed in a matrix 18 of the base pressure-sensitive adhesive material in the form of islands. In an interface where the pressure-sensitive adhesive layer 13 is in contact with the second optical element 4, there are a region where the base pressure-sensitive adhesive material is in contact with the second optical element 4 and a region where the high refractive index material particles 17 are in contact with the second optical element 4. Preferably, an area ratio of the high refractive index material particles 17 to a total of the high refractive index material particles 17 and the base pressure-sensitive adhesive material at the above position is set in the range of 30 to 99%.

The area ratio is calculated by measuring an area of the high refractive index material particles 17 in each of a plurality of square regions having a side length of 10 μm to 200 μm to obtain a ratio of the area of the high refractive index material particles 17 to the entire area of the square region, and averaging the area ratios measured in the plurality of square regions.

Figure 5A:
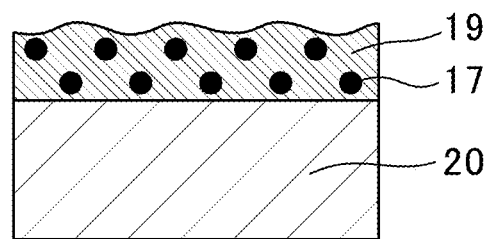
FIG. 5(a) is a schematic diagram illustrating a step of application of a dispersion liquid, in a process for preparing the pressure-sensitive adhesive layer depicted in FIG. 2.
Figure 5B:
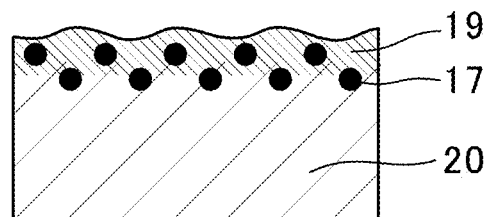
FIG. 5(b) is a schematic diagram illustrating a step of infiltration with high refractive index material particles, in the process for preparing the pressure-sensitive adhesive layer depicted in FIG. 2.
Figure 5C:
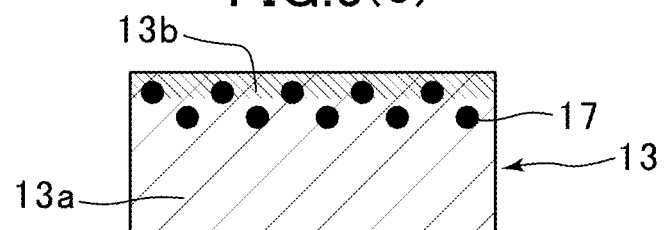
FIG. 5(c) is a schematic diagram illustrating a drying step, in the process for preparing the pressure-sensitive adhesive layer depicted in FIG. 2.

FIGS. 5(a), 5(b) and 5(c) schematically illustrate a process of producing the pressure-sensitive adhesive layer 13 in FIG. 2. First of all, a dispersion liquid 19 obtained by dispersing the high refractive index material particles 17 in a dispersion medium, and a matrix material-based pressure-sensitive adhesive layer 20, are preliminarily provided. Then, as depicted in FIG. 5(a), the dispersion liquid 19 is applied to a surface of the matrix material-based pressure-sensitive adhesive layer 20. Thus, the surface of the matrix material-based pressure-sensitive adhesive layer 20 is swelled by the dispersion medium of the dispersion liquid 19, and, in this process, the high refractive index material particles 17 in the dispersion liquid 19 infiltrate into the matrix material-based pressure-sensitive adhesive layer 20 in the thickness direction. This state is depicted in FIG. 5(b). Subsequently, the matrix material-based pressure-sensitive adhesive layer 20 infiltrated with the high refractive index material particles 17 is dried to vaporize the dispersion medium of the dispersion liquid 19 to obtain the pressure-sensitive adhesive layer 13 depicted in FIG. 2, i.e., a refractive index adjustment zone-formed pressure-sensitive adhesive layer. This state is depicted in FIG. 5(c).

An infiltration depth of the high refractive index material particles 17 with respect to the matrix material-based pressure-sensitive adhesive layer 20 is determined by a relationship between the base pressure-sensitive adhesive material and the dispersion medium of the dispersion liquid 19. The dispersion medium may be appropriately selected to enable the infiltration depth to become the aforementioned value.

Figure 6:
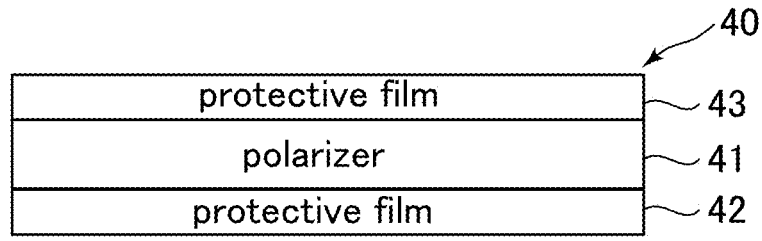
FIG. 6 is a schematic sectional view depicting a configuration of a polarizing film laminate 40 according to a first embodiment of the present invention.

The polarizing film may be constructed such that a transparent protective film is provided on one or each of opposite surfaces of a polarizer. For example, as one embodiment, a polarizing film 40 schematically depicted in FIG. 6 is conceivable. The polarizing film 40 comprises a polarizer 41, and two protective films 42, 43 arranged to sandwich the polarizer 41 therebetween to protect the polarizer 41. As the polarizer 41 usable in the present invention, various polarizers may be used. Examples of the polarizer 41 include a film obtained by causing a dichroic substance such as iodine or a dichroic dye to be adsorbed to a hydrophilic polymer film such as a polyvinyl alcohol-based film, a partially formalized polyvinyl alcohol-based film, or an ethylene-vinyl acetate copolymer-based partially saponified film, and uniaxially stretching the dyed film, and a polyene-based molecularly-oriented film such as a dehydration product of polyvinyl alcohol and a dehydrochlorination product of polyvinyl chloride. Among them, a polarizer composed of a polyvinyl alcohol-based film containing a dichroic substance such as iodine is preferable, and an iodine-based polarizer containing iodine and/or iodine ion is more preferable. A thickness of the polarizer is generally, but not particularly limited to, about 5 to 80 μm.

For example, a polarizer can be produced by dyeing a polyvinyl alcohol-based film using iodine and uniaxially stretching the dyed polyvinyl alcohol-based film, more specifically, by immersing a polyvinyl alcohol-based film in an aqueous iodine solution to dye the film, and stretching the dyed film to three to seven times its original length. If necessary, the film may be immersed in an aqueous solution of boric acid, or potassium iodide which may contains zinc sulfate or zinc chloride, or the like. Further, if necessary, the polyvinyl alcohol-based film may be immersed in water for washing before dyeing. The water washing of the polyvinyl alcohol-based film can provide an advantageous effect of being able to clean contamination and an anti-blocking agent from a surface of the polyvinyl alcohol-based film, and cause swelling of the polyvinyl alcohol-based film to thereby prevent evenness of dyeing. The film may be stretched after or during dyeing using iodine, or may be dyed using iodine after stretching. The film may be stretched in an aqueous solution of boric acid, potassium iodide or the like, or in a water bath.

In the present invention, it is possible to use a thinned polarizer having a thickness of 10 μm or less. From a viewpoint of thickness reduction, the thickness is preferably from 1 to 7 μm. Such a thinned polarizer is preferable because of less thickness unevenness, excellent visibility, less dimensional change providing excellent durability, and capability of facilitating thickness reduction in a polarizing film.

Typical examples of such a thinned polarizer include thinned polarizers described in JP 51-069644A, JP 2000-338329A, the pamphlets of WO 2010/100917A, JP 4751481B and JP 2012-073563A. These thinned polarizers can be obtained by a process comprising the steps of: stretching a laminate of a polyvinyl alcohol-based resin (hereinafter referred to occasionally as PVA-based resin) layer and a stretchable resin substrate; and dyeing the laminate. Using this process, the PVA-based resin layer, even when it is thin, can be stretched without problems such as breakage, which would otherwise be caused by stretching the layer supported on a stretchable resin substrate.

Among processes comprising the steps of stretching and dyeing a film in the form of a laminate, from a viewpoint of being capable of achieving a high stretching ratio to improve polarization performance, the thinned polarizer is obtained preferably by a process comprising the step of stretching a film in an aqueous boric acid solution as described in the pamphlets of WO 2010/100917A, JP 4751481B and JP 2012-073563A, and, more preferably, by a process comprising the step of subjecting a film to auxiliary in-air stretching before stretching in an aqueous boric acid solution as described in JP 4751481B and JP 2012-073563A.

With regard to the protective film (42, 43), in order to suppress stretching/contraction of the polarizer 41 to reduce influence of temperature and humidity, a polarizing film for a display device is used in the form of a laminate obtained by laminating a 40 to 80 μm TAC (triacetylcellulose-based) film to each of the opposite surfaces of the polarizer 41. Indeed, after formation of a display device, a display panel side opposite to the viewing side can be protected by a display panel itself or other optical elements. Thus, it is possible to use a polarizing film comprising only one protective film provided on the viewing side, without providing any protective film on the display panel side.

The protective film 42 (43) laminated on the viewing side with respect to the polarizer 41 may be formed as a functional layer imparted with an additional function. Examples of the functional layer include a hard coat (HC) layer, an antireflection (ARC) layer, an antifouling layer, an antistatic layer, and a treated layer for diffusion or anti-glare. The functional layer may be formed by arbitrarily combining two or more of them. Further, an ultraviolet absorption function may be imparted to an element substrate of the protective film. A thickness of the protective film may be appropriately determined. Generally, from a viewpoint of strength, workability such as handleability, thinning ability, etc., the thickness is set in the range of 1 μm to 500 μm, preferably, in the range of 5 μm to 200 μm, more preferably, in the range of 5 μm to 100 μm. In the polarizing film to be used in the present invention, instead of the transparent protective layer, a retardation film or the like may be formed on a polarizer. Alternatively, a functional film such as a retardation film may be additionally laminated onto the transparent protective film 42 (43). In the present invention, when a retardation film is used with a polarizer, it may be composed of a single element or a plurality of elements and formed in a single-layer structure or a multi-layer structure. As the retardation film, it is possible to appropriately use a retardation film obtained by stretching and contracting a polymer film, or a retardation film in which a liquid crystal material is oriented and immobilized, depending on the intended use.

The polarizing film is laminated to a display cell directly or indirectly through one or more other elements. For example, in a liquid crystal panel, two polarizing films are used, respectively, on both sides of a liquid crystal cell. On the other hand, in an organic EL panel, one polarizing film is used on a viewing side of an organic EL cell. A liquid crystal cell drive mode is not particularly limited, but any of various heretofore-known modes may be used. Examples of the drive mode include a twisted nematic (TN) mode, a super twisted nematic (STN) mode, an electrically-controlled birefringence (ECB) mode, a vertical alignment (VA) mode, an in-plane switching (IPS) mode, a fringe field switching (FFS) mode, optically compensated bend (OCB) mode, hybrid-aligned nematic (HAN) mode, a surface-stabilized ferroelectric liquid crystal (SSFLC) mode, and an anti-ferroelectric liquid crystal (AFLC) mode. Among them, from a viewpoint of being capable of minimizing brightness change/color change due to viewing angle, it is preferable to use the in-plane switching (IPS) mode. Further, as necessary, a color filter, a black matrix or the like may be provided on either substrate of a liquid crystal cell. An image display device to which a liquid crystal panel using the present invention is applicable is not limited to a liquid crystal display device or an organic EL display device, but may be any other type of image display device comprising a liquid crystal panel capable of utilizing the present invention.

There is a type of liquid crystal panel in which a transparent electroconductive layer such as an indium tin oxide (ITO) thin film is formed on one of a pair of transparent substrates of a liquid crystal cell thereof. Further, there is a type of display panel having a touch sensor function, for example, in a liquid crystal cell itself. Examples of the touch sensor include a touch sensor formed on a surface of a display cell module (i.e., on-cell touch panel) or a touch sensor formed inside a display cell module (i.e., in-cell touch panel). These are further classified into subclasses, by a difference in number and position of sensor layers.

FIG. 7(*a*) depicts a polarizing film laminate 50 according to one embodiment of the present invention. The polarizing film laminate 50 comprises a polarizing film 40 and a pressure-sensitive adhesive layer 13 on one principal surface of the polarizing film 40. The pressure-sensitive adhesive layer 13 is attached to the polarizing film 40 in a state in which a base adhesive zone 13*a* thereof faces the polarizing film 40. The polarizing film laminate 50 can be obtained by peeling off a support S1 attached to the pressure-sensitive adhesive layer 13, and attaching the resulting exposed surface of the pressure-sensitive adhesive layer 13 to the polarizing film 40.

Then, a display panel can be obtained by peeling off a support S2 attached to a surface of a refractive index adjustment zone 13*b* of the polarizing film laminate 50, and attaching the resulting exposed surface of the pressure-sensitive adhesive layer 13 to a display cell directly or indirectly through a second optical element. A second optical element can be laminated to one principal surface of the polarizing film laminate 50 defined by the polarizing film 40, through a pressure-sensitive adhesive layer or an adhesive, to form an optical laminate, and this optical laminate may be used for manufacturing of a display panel. When the pressure-sensitive adhesive layer 13 is directly brought to market, it is not easy to distinguish between the base adhesive zone 13*a* and the refractive index adjustment zone 13*b*, leading to a risk that the pressure-sensitive adhesive layer 13 is attached in a back-to-front manner when used in a customer's plant. In contrast, the optical film laminate 50 has one surface defined by the polarizing film 40, so that there is an advantage of enabling a customer or user to easily identify obverse and reverse surfaces during attachment, thereby reducing the risk of misidentifying a surface to be attached.

FIG. 8(*a*) depicts a liquid crystal panel 60 according to one embodiment of the present invention, wherein the polarizing film laminate 50 is laminated to a liquid crystal cell 61. Although the polarizing film laminate 50 may be used in a structure where it is directly laminated to a liquid crystal cell 61, this liquid crystal panel 60 comprises: the polarizing film laminate 50 disposed such that the other principal surface of the pressure-sensitive adhesive layer 13 defined by the refractive index adjustment zone 13*b* faces an aftermentioned liquid crystal cell 61; an antistatic layer 62, and a liquid crystal cell 61, which are arranged in this order from the viewing side. The antistatic layer 62 is composed of a transparent electroconductive element made of ITO or the like, but not patterned because of its intended purpose. A reflectance of external light can be reduced to weaken reflected light, by setting each of a refractive index of the transparent electroconductive element and a refractive index of the refractive index adjustment zone 13*b* of the pressure-sensitive adhesive layer 13 to a relatively small value. Further, the refractive index of the refractive index adjustment zone 13*b* is greater than a refractive index of the base adhesive zone 13*a*. Thus, external light is reflected at an interface therebetween, so that light reflected at an interface between the antistatic layer 62 and the refractive index adjustment zone 13*b* can be at least partially cancelled out by means of optical interference with the reflected light.

For example, the liquid crystal panel 60 according to this embodiment can be obtained by: laminating an amorphous ITO layer to a glass substrate on the viewing side of the liquid crystal cell 61 having a refractive index of 1.53; heating and crystallizing the amorphous ITO layer to form the antistatic layer 62 on the liquid crystal cell 61; and laminating the polarizing film laminate 50 to the antistatic layer 62 on the liquid crystal cell 61. Although the liquid crystal display device may be a VA-type liquid crystal display device or may be an IPS liquid crystal display device, the IPS liquid crystal display device is particularly suitable. The IPS liquid crystal display device is a transverse electric field type in which an electric field for controlling liquid crystal is applied parallel to glass substrates, and there is no electrode in a glass substrate on the side of a color filter. Therefore, in order to prevent uneven display which would otherwise be caused by static electrification of the glass substrate, the transparent the antistatic layer 62 is provided on the glass substrate. Thus, it is effective to use the polarizing film laminate 50 capable of reducing reflected light.

FIG. 8(*b*) depicts a touch panel 70 (touch sensor-equipped liquid crystal panel 70) according one embodiment of the present invention, wherein the polarizing film laminate 50 is laminated to a touch sensor-equipped liquid crystal cell 71. For example, the touch panel 70 is obtained by providing a patterned transparent electroconductive layer 72 on an on-cell type liquid crystal cell 71 having a touch sensor on the liquid crystal cell, to detect a change in capacitance caused by a touch of a human finger or the like; and laminating the polarizing film laminate 50 to the liquid crystal cell 71 while disposing the refractive index adjustment zone 13b of the pressure-sensitive adhesive layer 13 to face the liquid crystal cell 71. Although the liquid crystal cell in this embodiment is an on-cell type, it may be an in-cell type. Further, the transparent electroconductive layer 72 may be formed to function as a touch sensor by itself. The refractive index adjustment zone 13b is designed such that the refractive index thereof is set to a value between respective refractive indexes of the transparent electroconductive layer 72 and a viewing-side surface of the liquid crystal cell 71. For example, the viewing-side surface of the liquid crystal cell 71 is formed of glass, and the refractive index thereof is about 1.53. Considering that ITO has a refractive index of 1.85, the refractive index of the refractive index adjustment zone 13b is preferably in the range of 1.60 to 1.80. By using the polarizing film laminate 50, reflected light at an interface between the transparent electroconductive layer 72 and the refractive index adjustment zone 13b and reflected light at an interface between the viewing-side surface of liquid crystal cell 71 and the refractive index adjustment zone 13b are reduced, so that it becomes possible to enable the pattern of the transparent electroconductive layer 72 to become less likely to be viewed from the viewing side.

Figure 7A:
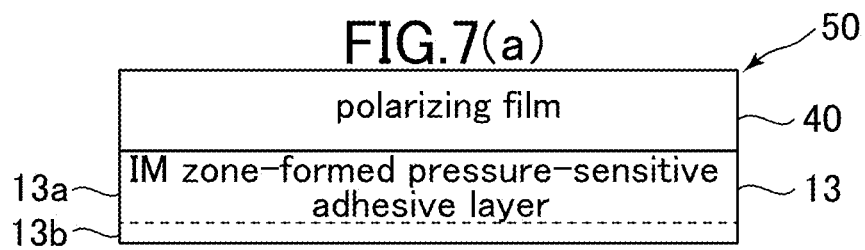
FIG. 7(a) is a schematic diagram depicting a configuration of a polarizing film laminate 50 according to a second embodiment of the present invention.
Figure 7B:
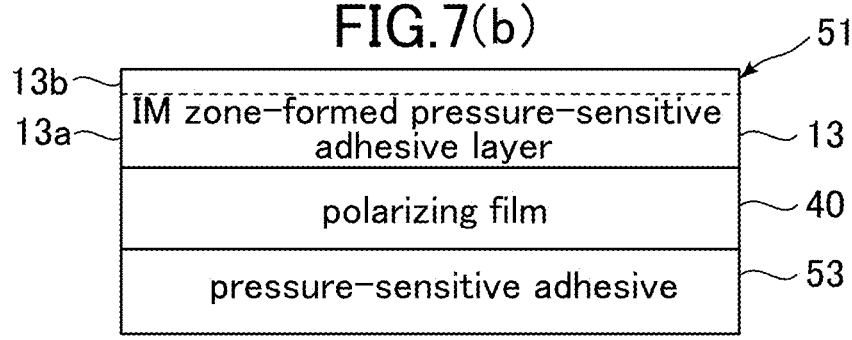
FIG. 7(b) is a schematic diagram depicting a configuration of a polarizing film laminate 51 according to a third embodiment of the present invention.

FIG. 7(b) depicts a polarizing film laminate 51 according to one embodiment of the present invention. The polarizing film laminate 51 comprises: a polarizing film 40; the pressure-sensitive adhesive layer 13 (first pressure-sensitive adhesive layer 13) located on one principal surface of the polarizing film 40 and formed to have the base adhesive zone 13a defining one principal surface thereof facing the polarizing film 40; and a second pressure-sensitive adhesive layer 53 located on the other principal surface of the polarizing film 40 and formed of only a base pressure-sensitive adhesive material. Which of the first pressure-sensitive adhesive layer 13 and the second pressure-sensitive adhesive layer 53 is faced toward a display cell during use is determined depending on device design. In the polarizing film laminate 51, the second pressure-sensitive adhesive layer 53 is attached to the polarizing film 40, so that a separator to be used between the second pressure-sensitive adhesive layer 53 and the polarizing film 40, and a release film for protecting one surface of the polarizing film 40 can be eliminated to reduce waste elements. Further, the second pressure-sensitive adhesive layer 53 is preliminarily attached to the polarizing film 40, so that it becomes possible to reduce the number of peeling operations for a pressure-sensitive adhesive layer.

Figure 8A:
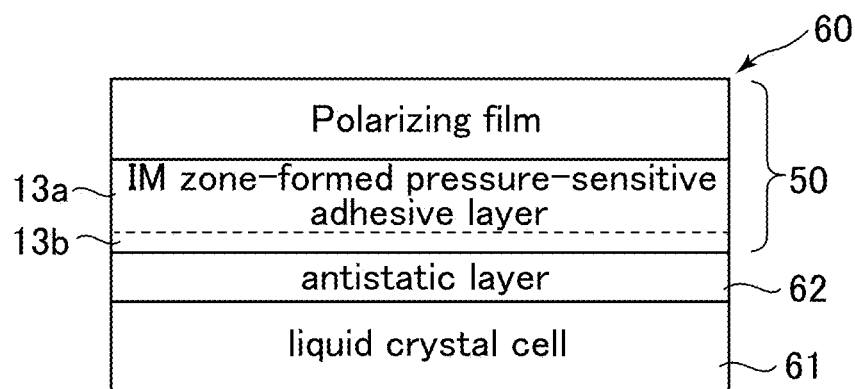
FIG. 8(a) is a schematic diagram depicting a configuration of a display device using a polarizing film laminate according to one embodiment of the present invention.
Figure 8B:
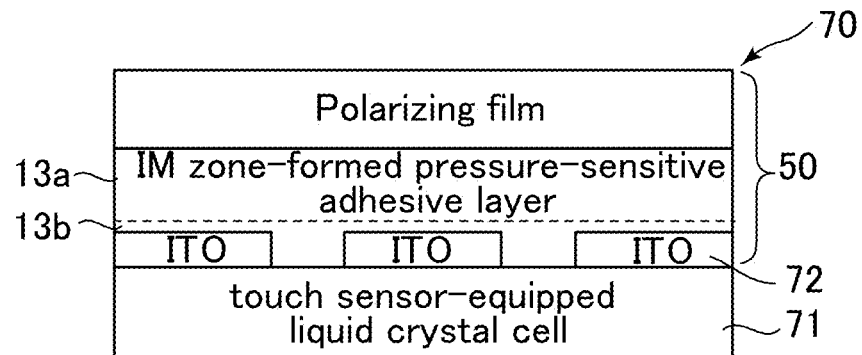
FIG. 8(b) is a schematic diagram depicting a configuration of another display device using a polarizing film laminate according to one embodiment of the present invention.
Figure 8C:
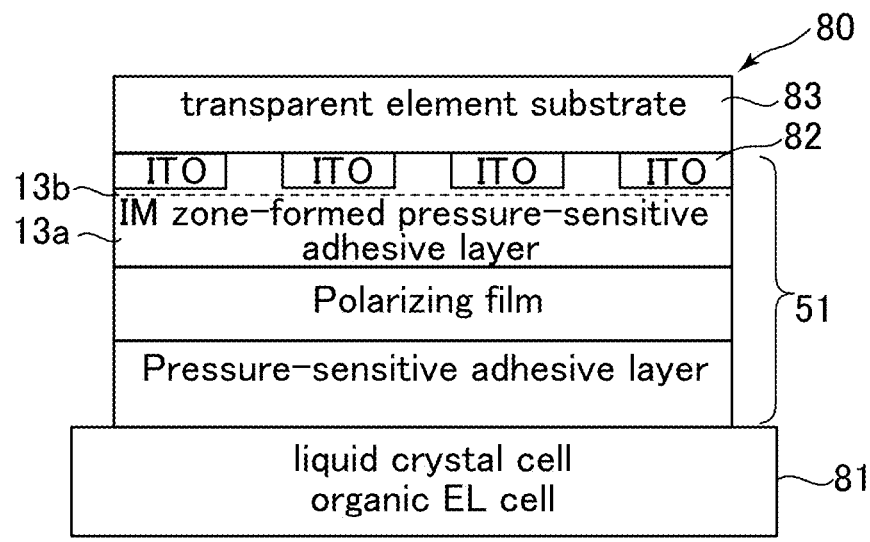
FIG. 8(c) is a schematic diagram depicting a configuration of yet another display device using a polarizing film laminate according to one embodiment of the present invention.

FIG. 8(c) depicts a touch panel 80 (touch sensor-equipped display panel 80) using a polarizing film laminate 50, according one embodiment of the present invention. The touch panel 80 comprises: a display cell 81 composed of a liquid crystal cell or an organic EL cell; a polarizing film laminate 51 comprising the pressure-sensitive adhesive layer 13 (first pressure-sensitive adhesive layer 13) facing toward the viewing side; and a transparent element substrate 83 formed with a patterned transparent electroconductive layer 82 on the side of a display device 71, which are arranged in this order from a display-cell side. For example, the touch panel can be obtained by laminating a second pressure-sensitive adhesive layer 53 of the polarizing film laminate 51 to a viewing-side surface of the display cell 81, and laminating the first pressure-sensitive adhesive layer 13 of the polarizing film laminate 51 to a surface of the element substrate 83 on the side of the transparent electroconductive layer 82. Although the transparent element substrate 82 is preferably made of ITO, it may be made of any other suitable transparent electroconductive material or may be formed of nanowires made of a metal such as silver or gold. By setting the refractive index of the refractive index adjustment zone 13b to a value between respective refractive indexes of the transparent electroconductive layer 82 and the transparent element substrate 83, a reflectance at an interface between the refractive index adjustment zone 13b, and each of the transparent electroconductive layer 82 and the transparent element substrate 83 can be reduced, so that it becomes possible to enable the pattern of the transparent electroconductive layer 82 to become less likely to be viewed from the viewing side. The transparent element substrate 83 may be either of a glass substrate and a resin (film) element substrate, or may be a multi-layer element substrate such as a resin-reinforced multi-layer thinned glass substrate, capable of coping with a flexible screen.

Figure 7C:
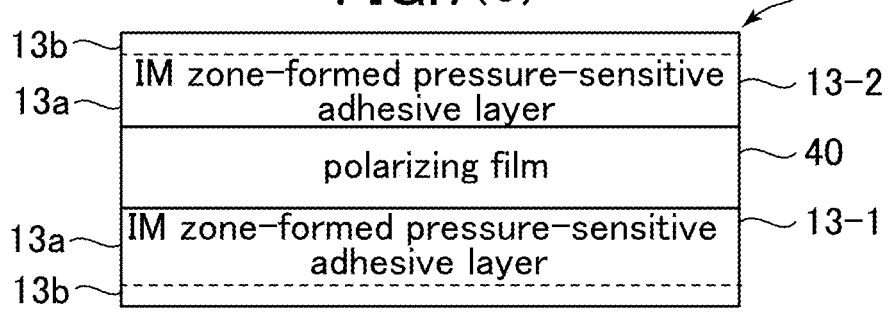
FIG. 7(c) is a schematic diagram depicting a configuration of a polarizing film laminate 52 according to a fourth embodiment of the present invention.

FIG. 7(a) to FIG. 7(c) depicts a polarizing film laminate 52 according to one embodiment of the present invention. The polarizing film laminate 52 comprises a polarizing film 40, and two pieces of the pressure-sensitive adhesive layers 13-1, 13-2. Each of the pressure-sensitive adhesive layers 13-1, 13-2 is attached such that the base adhesive zone 13a faces the polarizing film 40. By setting the refractive index of the refractive index adjustment zone 13b in each of the pressure-sensitive adhesive layers 13-1, 13-2 to a value close to a refractive index of an optical element to which the pressure-sensitive adhesive layer 13-1 or 13-2 is attached, it becomes possible to reduce a reflectance. In this case, the refractive indexes of the refractive index adjustment zones 13b in the two pressure-sensitive adhesive layers 13-1, 13-2 may be determined in relation with respective optical elements adjacent to them, and therefore may not be identical to each other. In the polarizing film laminate 52, the pressure-sensitive adhesive layer 13-1 is attached to the polarizing film 40, so that a separator for one (inner) surface of the pressure-sensitive adhesive layer 13-1, and a release film to be attached to one surface of the polarizing film 40 to protect it during transportation can be eliminated to reduce waste elements. Further, the pressure-sensitive adhesive layer 13-1 is preliminarily attached to the polarizing film 40, so that it becomes possible to reduce the number of peeling operations for a pressure-sensitive adhesive layer.

Figure 8D:
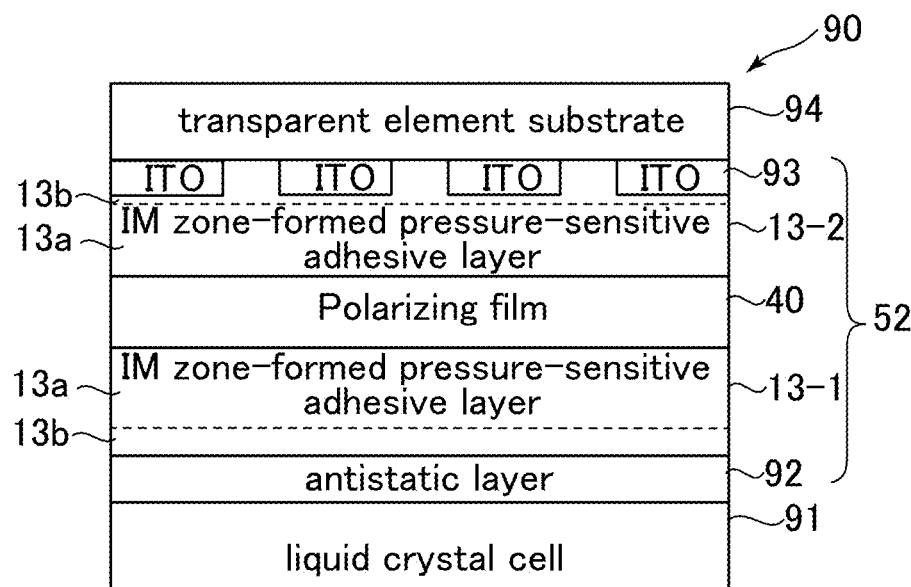
FIG. 8(d) is a schematic diagram depicting a configuration of still another display device using a polarizing film laminate according to one embodiment of the present invention.

FIG. 8(d) depicts a touch panel 90 (touch sensor-equipped display panel 90) using a polarizing film laminate 52, according one embodiment of the present invention. The touch panel 90 comprises: a display cell 91 such as a liquid crystal cell; an antistatic layer 92 composed of a transparent electroconductive element made of ITO or the like; the polarizing film laminate 52 attached to the antistatic layer 92; a patterned transparent electroconductive layer 93 made of ITO or the like; and a transparent element substrate 94 for allowing the transparent electroconductive layer 93 to be formed thereon, which are arranged in this order from the display-cell side. By using the pressure-sensitive adhesive layer 13-1 located on the display-cell side in the polarizing film laminate 52 to reduce a difference in refractive index between the refractive index adjustment zone 13b of the pressure-sensitive adhesive layer 13-1 and a refractive index of the antistatic layer 92, it becomes possible to reduce reflected light. By using the pressure-sensitive adhesive layer 13-2 located on the viewing side in the polarizing film laminate 52 to design the refractive index adjustment zone 13b such that the refractive index thereof is set to a value between respective refractive indexes of the patterned transparent electroconductive layer 93 and the transparent element substrate 94, it becomes possible to reduce reflected light to enable the problem "poor pattern invisibility" to become less likely to occur.

EXAMPLES

The present invention will be further described below, based on examples.

[Production of Base Pressure-Sensitive Adhesive Materials]

<Production of Acrylic Oligomer>

60 weight parts of dicyclopentanyl methacrylate (DCPMA), 40 weight parts of methyl methacrylate (MMA), 3.5 weight parts of α-thioglycerol as a chain transfer agent, and 100 weight parts of toluene as a polymerization medium were put into a four-neck flask, and stirred in a nitrogen atmosphere at 70° C. for 1 hour. Then, 0.2 weight parts of 2,2'-azobisisobutyronitrile as a polymerization initiator was put into the four-neck flask to cause a reaction at 70° C. for 2 hours, followed by a further reaction at 80° C. for 2 hours. Then, the resulting reaction solution was placed in an atmosphere at 130° C. to remove the toluene, the chain transfer agent and unreacted monomers therefrom by drying to thereby obtain an acrylic-based polymer in a solid form. The acrylic-based polymer obtained in this manner was named as "acrylic-based polymer (A-1)". A weight-average molecular weight (Mw) of the acrylic-based polymer (A-1) was $5.1 \times 10^3$.

<Production of Pressure-Sensitive Adhesive Layer A>

0.035 weight parts of a photopolymerization initiator (trade name: "IRGACURE 184", manufactured by BASF SE.) and 0.035 weight parts of a photopolymerization initiator (trade name "IRGACURE 651" manufactured by BASF SE.) were added to a monomer mixture of 68 weight parts of 2-ethylhexyl acrylate (2EHA), 14.5 weight parts of N-vinyl-2-pyrrolidone (NVP) and 17.5 weight parts of 2-hydroxyethyl acrylate (HEA), and then the resulting monomer mixture was exposed to ultraviolet light in a nitrogen atmosphere in such a manner as to be partially photopolymerized, thereby obtaining a partially polymerized product having a polymerization rate of about 10 weight % (acrylic-based polymer syrup).

Then, 5 weight parts of the acrylic-based polymer (A-1), 0.15 weight parts of hexanediol diacrylate (HDDA) and 0.3 weight parts of a silane coupling agent (trade name: "KBM-403", manufactured by Shin-Etsu Chemical Co., Ltd.) were added to and uniformly mixed with the acrylic-based polymer syrup obtained in the above manner to obtain an acrylic-based pressure-sensitive adhesive composition. The acrylic-based pressure-sensitive adhesive composition was applied onto a release-treated surface of a separator film (trade name: "DIAFOIL MRF#38", manufactured by Mitsubishi Plastics, Inc.) in such a manner that a thickness thereof after being formed as a matrix material-based pressure-sensitive adhesive layer becomes 25 μm, thereby forming a pressure-sensitive adhesive composition layer. Then, a separator film (trade name: "DIAFOIL MRF#38", manufactured by Mitsubishi Plastics, Inc.) was attached onto a surface of the pressure-sensitive adhesive composition layer in such a manner that a release-treated surface of the separator film faces the applied layer. In this way, the applied layer of the monomer component is blocked from oxygen. Subsequently, the pressure-sensitive adhesive composition layer was irradiated with ultraviolet light in such a manner as to be photocured, under conditions including illuminance: 5 mW/cm², and light intensity: 1,500 mJ/cm², thereby forming a pressure-sensitive adhesive layer A.

<Production of Pressure-Sensitive Adhesive Layer B1>

28.5 weight parts of 2-ethylhexyl acrylate (2EHA), 28.5 weight parts of isostearyl acrylate (ISTA), 22 weight parts of isobornyl acrylate, 20 weight parts of 4-hydroxybutyl acrylate (4HBA), and two types of photopolymerization initiators: 0.05 weight parts of a photopolymerization initiator (trade name: "IRGACURE 184", manufactured by BASF SE.) and 0.05 weight parts of a photopolymerization initiator (trade name: "IRGACURE 651", manufactured by BASF) were mixed together, and the resulting monomer mixture was exposed to ultraviolet light in a nitrogen atmosphere in such a manner as to be partially photopolymerized, thereby obtaining a partially polymerized product (acrylic-based polymer syrup) having a polymerization rate of about 10 weight %.

Then, 0.3 weight parts of hexanediol diacrylate (HDDA) and 0.3 weight parts of a silane coupling agent (trade name: "KBM-403", manufactured by Shin-Etsu Chemical Co., Ltd.) were added to and evenly mixed with the acrylic-based polymer syrup obtained in the above manner to obtain an acrylic-based pressure-sensitive adhesive composition. The acrylic-based pressure-sensitive adhesive composition was applied onto a release-treated surface of a separator film (trade name: "DIAFOIL MRF#38", manufactured by Mitsubishi Plastics, Inc.) in such a manner that a thickness thereof after being formed as a matrix material-based pressure-sensitive adhesive layer becomes 25 μm, thereby forming a pressure-sensitive adhesive composition layer. Then, a separator film (trade name: "DIAFOIL MRF#38", manufactured by Mitsubishi Plastics, Inc.) was attached onto a surface of the pressure-sensitive adhesive composition layer in such a manner that a release-treated surface of the separator film faces the applied layer. In this way, the applied layer of the monomer component is blocked from oxygen. Subsequently, the pressure-sensitive adhesive composition layer was irradiated with ultraviolet light in such a manner as to be photocured, under conditions including illuminance: 5 mW/cm², and light intensity: 1,500 mJ/cm², thereby forming a pressure-sensitive adhesive layer B1.

<Production of Pressure-Sensitive Adhesive Layer B2>

A pressure-sensitive adhesive layer B2 was firmed in the same procedure as that for the pressure-sensitive adhesive layer B1, except that the acrylic-based pressure-sensitive adhesive composition was applied such that the thickness thereof after being formed as a matrix material-based pressure-sensitive adhesive layer becomes 150 μm.

<Production of Pressure-Sensitive Adhesive Layer C>

63 weight parts of 2-ethylhexyl acrylate (2EHA), 15 weight parts of N-vinyl-2-pyrrolidone (NVP), 9 weight parts of methyl methacrylate (MMA) and 13 weight parts of hydroxyethyl acrylate (HEA), as a monomer component, and 200 weight parts of ethyl acetate, as a polymerization medium, were put into a separable flask provided with a thermometer, a stirrer, a cooling tube and a nitrogen gas inlet, and stirred for 1 hour while nitrogen was introduced thereinto. After removing oxygen inside a polymerization system in this manner, 0.2 weight parts of 2,2'-azobis (isobutyronitrile) was added as a polymerization initiator, and the system was heated up to 60° C. to induce a reaction therein for 10 hours. Then, toluene was added thereto to obtain an acrylic-based polymer solution having a solid concentration of 30 weight %, and a weight-average molecular weight (Mw) of 800,000. With respect to (100 weight parts of a solid content of) this acrylic-based polymer solution, 1.0 weight part of trimethylolpropane xylylene diisocyanate as an isocyanate-based cross-linking agent ("TAKENATE D110N", manufactured by Mitsui Chemicals, Inc.,), and 0.2 pasts of a silane coupling agent ("KBM-403", manufactured by Shin-Etsu Chemical Co., Ltd.) were added to prepare a pressure-sensitive adhesive composition (solution). Then, the pressure-sensitive adhesive solution prepared in the above manner was applied onto a release-treated surface of a separator film (trade name: "DIAFOIL MRF#75", manufactured by Mitsubishi Plastics, Inc.), in such a manner that a thickness thereof after being formed as a matrix material-based pressure-sensitive adhesive layer becomes 23 μm. The resultant was thermally dried at 60° C. for 3 minutes and at 155° C. for 4 minutes and further aged at 50° C. for 72 hours, under ambient pressure, to produce a pressure-sensitive adhesive layer C.

[Production of Refractive Index Adjustment Zone-Formed Pressure-Sensitive Adhesives]

<Case of Using Pressure-Sensitive Adhesive Layer A & High Refractive Index Material Nanoparticle Dispersion Liquid>

(Case of Using Pressure-Sensitive Adhesive Layer A & Nanoparticle Dispersion Liquid)

A 25 μm-thick pressure-sensitive adhesive layer A (refractive index: 1.49) having opposite surfaces each protected by a lightly-peelable PET separator sheet was prepared, and one of the lightly-peelable PET separator sheets was peeled off. A coating liquid (dispersion medium: ethanol, particle concentration: 1.2 weight %, transmittance of dispersion liquid: 82%; manufactured by CIK Nanotech Co., Ltd.) containing zirconia particles ($ZrO_2$, refractive index: 2.17, average primary particle size: 20 nm) and serving as a dispersion liquid containing high refractive index particles was applied to the exposed surface of the matrix material-based pressure-sensitive adhesive layer by using a bar coater RDS No. 5 in such a manner as to form a refractive index adjustment zone having a thickness of 20 nm to 200 nm, and dried in a drying oven at 110° C. for 180 seconds. Then, a PET separator sheet (75 μm) serving as a support (backing) was attached onto a surface of the resulting pressure-sensitive adhesive layer in which the zirconia ($ZrO_2$) particles are dispersed, thereby obtaining a refractive index adjustment zone-formed pressure-sensitive adhesive layer (1). An average primary particle size of the zirconia particles was measured by TEM observation.

(Other Cases)

Using the following base pressure-sensitive adhesive materials and high refractive index material nanoparticle dispersion liquids, three refractive index adjustment zone-formed pressure-sensitive adhesive layers (2), (3), (4) were produced in the same manner as that in the above case. Materials used were the pressure-sensitive adhesive layer B1 (refractive index: 1.48), the pressure-sensitive adhesive layer C (refractive index: 1.49), the pressure-sensitive adhesive layer B2 (refractive index: 1.48) and the $ZrO_2$ nanoparticle dispersion liquid (dispersion medium: ethanol, particle size: 20 nm).

Properties of the above pressure-sensitive adhesives are summarized in Table 1.

TABLE 1

| Pressure-Sensitive Adhesive Layer | Base Pressure-Sensitive Adhesive Type | Thickness μm | High Refractuve Index Material | Production Method | Average Interfacial Refractive Index $n_D$ | Thickness of High Refractive Index Layer [nm] | Total Light Transmittance [%] | Haze Value | Adhesive Force at Surface of Refractive Index Adjustment Zone [N/25 mm] |
|---|---|---|---|---|---|---|---|---|---|
| Refractive index adjustment zone-formed pressure-sensitive adhesive layer (1) | (A) Refravtive index: 1.49 | 25 | Zirconium oxide (average particle size 20 nm) | Ethanol dispersion liquid (Solid content: 1.2 wt %, Transmittance of dispersion liquid: 82%) is applied and dried to form refractive index adjustment zone having thickness of 20 nm to 200 nm | 1.66 | 150 | 92.3 | 0.6 | 10 |
| Refractive index adjustment zone-formed pressure-sensitive adhesive layer (2) | (B) Refravtive index: 1.48 | 25 | Zirconium oxide (average particle size 20 nm) | Ethanol dispersion liquid (Solid content: 1.2 wt %, Transmittance of dispersion liquid: 82%) is applied and dried to form refractive index adjustment zone having thickness of 20 nm to 200 nm | 1.75 | 120 | 92.3 | 0.4 | 8 |
| Refractive index adjustment zone-formed pressure-sensitive adhesive layer (3) | (C) Refravtive index: 1.49 | 23 | Zirconium oxide (average particle size 20 nm) | Ethanol dispersion liquid (Solid content: 1.2 wt %, Transmittance of dispersion liquid: 82%) is applied and dried to form refractive index adjustment zone having thickness of 20 nm to 200 nm | 1.62 | 200 | 92.3 | 0.5 | 9 |
| Refractive index adjustment zone-formed pressure-sensitive adhesive layer (4) | (B) Refravtive index: 1.48 | 150 | Zirconium oxide (average particle size 20 nm) | Ethanol dispersion liquid (Solid content: 1.2 wt %, Transmittance of dispersion liquid: 82%) is applied and dried to form refractive index adjustment zone having thickness of 20 nm to 200 nm | 1.75 | 120 | 92.3 | 0.4 | 14 |
| Pressure-sensitive adhesive layer A (base material) | (A) Refravtive index: 1.49 | 25 | — | — | — | — | 92.3 | 0.5 | 14 |
| Pressure-sensitive adhesive layer B1 (base material) | (B) Refravtive index: 1.48 | 25 | — | — | — | — | 92.3 | 0.4 | 12 |

TABLE 1-continued

| Pressure-Sensitive Adhesive Layer | Base Pressure-Sensitive Adhesive | | High Refractuve Index Material | Production Method | Properties of Refractive Index Adjustment Zone in Laminate | | | | |
|---|---|---|---|---|---|---|---|---|---|
| | Type | Thick-ness μm | | | Average Interfacial Refractive Index $n_D$ | Thickness of High Refractive Index Layer [nm] | Total Light Trans-mittance [%] | Haze Value | Adhesive Force at Surface of Refractive Index Adjustment Zone [N/25 mm] |
| Pressure-sensitive adhesive layer C (base material) | (C) Refravtive index: 1.49 | 23 | — | — | — | — | 92.3 | 0.3 | 13 |
| Pressure-sensitive adhesive layer B2 (base material) | (B) Refravtive index: 1.48 | 150 | — | — | — | — | 92.3 | 0.4 | 20 |

[Production of Polarizing Film]
<Production of Polarizing Film (1)>

A 60 μm-thick polyvinyl alcohol film was stretched to 3 times between roll pairs having different feed speeds while being dyed in a solution containing iodine in a concentration of 0.3% and having a temperature of 30° C., for 1 minute. Then, the film was further stretched to attain a total stretching ratio of 6 times, while being immersed in an aqueous solution containing potassium iodide in a concentration of 10%, for 0.5 minutes. Subsequently, the stretched film was immersed in an aqueous solution containing potassium iodide in a concentration of 1.5% and having a temperature of 30° C., for 10 seconds so as to be cleaned, and dried at 50° C. for 4 minutes, thereby obtaining a 23 μm-thick polarizer (A-1). Then, an aqueous PVA-based resin solution was applied to each of opposite surfaces of the polarizer (A-1). A 20 μm-thick acrylic-based film was laminated to one of the surfaces, and a triacetylcellulose film (hereinafter referred to as "TAC film") comprising a hard coat layer and having a total thickness of 28 μm was laminated to the other surface. Then, the resulting laminate was dried to produce a polarizing film (1). The obtained polarizing film (1) had a transmittance of 42% and a polarization degree of 99.9%.

<Production of Polarizing Film (2)>

A 12 μm-thick polarizer (A-2) was produced in the same manner as that in the polarizing film (1), except that the thickness of the polyvinyl alcohol film in the polarizing film (1) was changed to 30 μm, and the concentration of the solutions, the immersion time and others were adjusted to cause a resulting polarizing film to have a transmittance of 44%. Then, an aqueous PVA-based resin solution was applied to each of opposite surfaces of the polarizer (A-2). A 20 μm-thick acrylic-based film was laminated to one of the surfaces, and a TAC film comprising an antireflection (AR) layer and having a total thickness of 43 μm was laminated to the other surface. Then, the resulting laminate was dried to produce a polarizing film (2). The obtained polarizing film (2) had a transmittance of 44% and a polarization degree of 99.9%.

<Production of Polarizing Film (3)>

A 23 μm-thick polarizer (A-3) was produced in the same manner as that in the polarizing film (1), except the concentration of the solutions, the immersion time and others for the polarizing film (1) were adjusted to cause a resulting polarizing film to have a transmittance of 43%. An aqueous PVA-based resin solution was applied to each of opposite surfaces of the polarizer (A-3). A 30 μm-thick retardation film (λ/1 plate, COP stretched film) was laminated to one of the surfaces in such a manner that a slow axis thereof was disposed at an angle of 45 degrees with respect to an absorption axis of the polarizer, and a 40 μm-thick TAC film was laminated to the other surface. Then, the resulting laminate was dried to produce a polarizing film (3). The obtained polarizing film (3) had a transmittance of 43% and a polarization degree of 99.9%.

<Production of Polarizing Film (4)>

A 28 μm-thick polarizer (A-4) was produced in the same manner as that in the polarizing film (1), except that the thickness of the polyvinyl alcohol film in the polarizing film (1) was changed to 80 μm, and the concentration of the solutions, the immersion time and others were adjusted to cause a resulting polarizing film to have a transmittance of 40%. Then, an aqueous PVA-based resin solution was applied to each of opposite surfaces of the polarizer (A-4), and a 25 μm-thick TAC film was laminated to each of the surfaces. Then, the resulting laminate was dried to produce a polarizing film (4). The obtained polarizing film (4) had a transmittance of 40% and a polarization degree of 99.9%.

<Production of Polarizing Film (5)>

A 12 μm-thick polarizer (A-5) was produced in the same manner as that in the polarizing film (2), except that the concentration of the solutions, the immersion time and others for the polarizing film (2) were adjusted to cause a resulting polarizing film to have a transmittance of 45%. Then, an aqueous PVA-based resin solution was applied to each of opposite surfaces of the polarizer (A-5). A 13 μm-thick non-stretched cycloolefin polymer (COP) film was laminated to one of the surfaces, and a 25 μm-thick TAC film was laminated to the other surface. Then, the resulting laminate was dried to produce a polarizing film (5). The obtained polarizing film (5) had a transmittance of 45% and a polarization degree of 99.8%.

<Production of Polarizing Film (6)>

A thermoplastic resin substrate (elongate-shaped non-crystallizable polyethylene terephthalate film, thickness: 100 μm, water absorption rate: 0.60 weight %, Tg: 80° C.) was prepared, and one surface thereof was subjected to a corona treatment. Then, an aqueous polyvinyl alcohol solution having a polymerization degree of 4200 and a saponification degree of 99.2 mol % was applied at 60° C. to the corona-treated surface, and dried to form a 10 μm-thick PVA-based resin layer, thereby producing a laminate.

The obtained laminate was stretched to 2.0 times in a machine direction (longitudinal direction) in a free-end uniaxial manner (auxiliary in-air stretching) between roll pairs having different feed speeds, within an oven at 120° C., and then the resulting laminate was immersed in an insolubilization bath (an aqueous boric acid solution obtained by adding 4 weight parts of boric acid to 100 weight parts of water) at a solution temperature of 30° C., for 30 seconds (insolubilization treatment).

The insolubilized laminate was immersed in a dyeing both (an aqueous iodine solution obtained by adding 0.2 weight parts of iodine and 1.0 weight part of potassium iodide to 100 weight parts of water) at a solution temperature of 30° C., for 60 seconds (dyeing treatment), and then the resulting laminate was immersed in a cross-linking bath (an aqueous boric acid solution obtained by adding 3 weight parts of potassium iodide and 3 weight parts of boric acid to 100 weight parts of water) at a solution temperature of 30° C., for 30 seconds (cross-linking treatment).

Subsequently, the obtained laminate was stretched in the machine direction (longitudinal direction) in a uniaxial manner (in-solution stretching) between roll pairs having different feed speeds, while being immersed in an aqueous baric acid solution (an aqueous solution obtained by adding 4 weight parts of boric acid and 5 weight parts of potassium iodide to 100 weight parts of water) at a solution temperature of 70° C., for 30 seconds, so as to attain a total stretching ratio of 5.5 times, and then the resulting laminate was immersed in a cleaning bath (an aqueous solution obtained by adding 4 weight parts of potassium iodide to 100 weight parts of water) at a solution temperature of 30° C. (cleaning treatment).

Through the above series of treatments, an optical film laminate comprising a 5 μm-thick polarizer (B-1) was obtained on the resin substrate.

Subsequently, an aqueous PVA-based resin solution was applied to one of opposite surfaces of the polarizer (B-1) of the obtained optical film laminate, and heated in a oven maintained at 60° C., for 5 minutes. Then, the thermoplastic resin substrate was peeled off to produce a polarizing film (6).

The obtained polarizing film (6) had a transmittance of 42% and a polarization degree of 99.8%.

Properties of the above polarizing films (1) to (6) are summarized in Table 2.

<Production of Transparent Electroconductive Layer Using Glass Element Substrate (Non-Patterned)>

A 20 nm-thick ITO film was formed on one surface of an alkali-free glass (refractive index: 1.53) by a sputtering process to produce a transparent electroconductive element substrate (1) having a non-crystallized ITO film (refractive index: 1.85). A Sn rate of the non-crystallized ITO thin film was 3 weight %. The Sn rate of the non-crystallized ITO thin film was calculated based on the following formula: Weight of Sn atoms/(weight of Sn atoms+weight of In atoms)

<Production of Transparent Electroconductive Layer Using Glass Element Substrate (Patterned)>

A 20 nm-thick ITO film was formed on one surface of an alkali-free glass (refractive index: 1.53) by a sputtering process to produce a transparent electroconductive element substrate having a crystallized ITO film (refractive index: 1.85). A Sn rate of the crystallized ITO thin film was 3 weight %. After a photoresist film was formed on a part of the transparent electroconductive layer, the resulting transparent electroconductive layer was immersed in 5 weight % of hydrochloric acid (aqueous hydrogen chloride solution) for 1 minute, and subjected to etching. In this way, an area (patterned area) where there is a transparent electroconductive layer equivalent to an electrode wiring pattern and an area (opening area) where the transparent electroconductive layer is removed were formed.

Specific inventive examples and comparative examples of a polarizing film laminate will be described below. It is to be understood that the present invention is not limited to the following examples.

Inventive Example 1

After peeling off the PET separator sheet on the base adhesive zone of the refractive index adjustment zone-formed pressure-sensitive adhesive layer (1), the resulting exposed surface of the refractive index adjustment zone-formed pressure-sensitive adhesive layer (1) was attached to the 20 μm-thick acrylic-based film of the polarizing film (1) to produce a polarizing film laminate (A) to which the refractive index adjustment zone-formed pressure-sensitive adhesive layer (1) was laminated such that the refractive index adjustment zone faced outwardly. After peeling off the PET separator sheet on the refractive index adjustment zone of the produced polarizing film laminate (A), the resulting exposed surface of the polarizing film laminate (A) was attached to the transparent electroconductive layer of the non-patterned transparent electroconductive layer-laminated element substrate (1) in such a manner as to cause the refractive index adjustment zone (zone having the high refractive index material particles) of the polarizing film

TABLE 2

| | Configuration of Polarizing Plate | | | | | |
|---|---|---|---|---|---|---|
| | Transparent | Properties of Polarizer | | | Transparent | |
| Polarizing Film | Protectiver Film (Outside) | Polarizer | Thickness (μm) | Single transmittance | Polarization degree | Protective Film (Panel side) | Retardation Plate (Panel side) |
| (1) | HC-TAC (28 μm) | Polarizer (A-1) | 23 | 42% | 99.9% | Acrylic (20 μm) | — |
| (2) | ARC-TAC (43 μm) | Polarizer (A-2) | 12 | 44% | 99.9% | Acrylic (20 μm) | — |
| (3) | TAC (40 μm) | Polarizer (A-3) | 23 | 43% | 99.9% | — | COP (30 μm) |
| (4) | TAC (25 μm) | Polarizer (A-4) | 28 | 40% | 99.9% | TAC (25 μm) | — |
| (5) | TAC (25 μm) | Polarizer (A-5) | 12 | 45% | 99.8% | COP film (13 μm) | — |
| (6) | Acrylic (20 μm) | Polarizer (B-1) | 5 | 42% | 99.8% | — | — | laminate to come into contact with the transparent electroconductive layer. A laminate configuration of the obtained film laminate in Inventive Example 1 is schematically depicted in FIG. 9(a).

Inventive Example 2

A film laminate was produced in the same manner as that in Inventive Example 1, except that the pressure-sensitive adhesive and the polarizing film to be laminated were changed to the refractive index adjustment zone-formed pressure-sensitive adhesive layer (2), and the polarizing film (2), wherein, after peeling off the PET separator sheet on the base adhesive zone, the resulting exposed surface was attached to the 20 μm-thick acrylic-based film in such a manner that the refractive index adjustment zone faced outwardly, to thereby produce a polarizing film laminate (B). A laminate configuration of the obtained film laminate in Inventive Example 2 is schematically depicted in FIG. 10(a).

Inventive Example 3

Figure 11A:
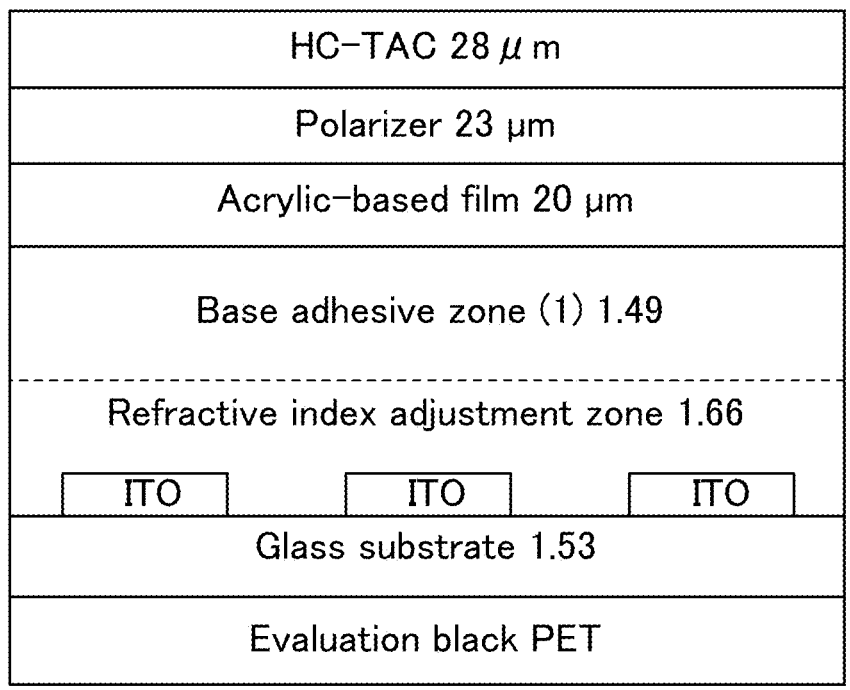
FIG. 11(a) is schematic diagram depicting a configuration of a polarizing film laminate in Inventive Example 3.

A film laminate was produced in the same manner as that in Inventive Example 1, except that the patterned transparent electroconductive layer-laminated element substrate (2) was used as a transparent electroconductive layer supporting substrate. A laminate configuration of the obtained film laminate in Inventive Example 3 is schematically depicted in FIG. 11(a).

Inventive Example 4

Figure 12A:
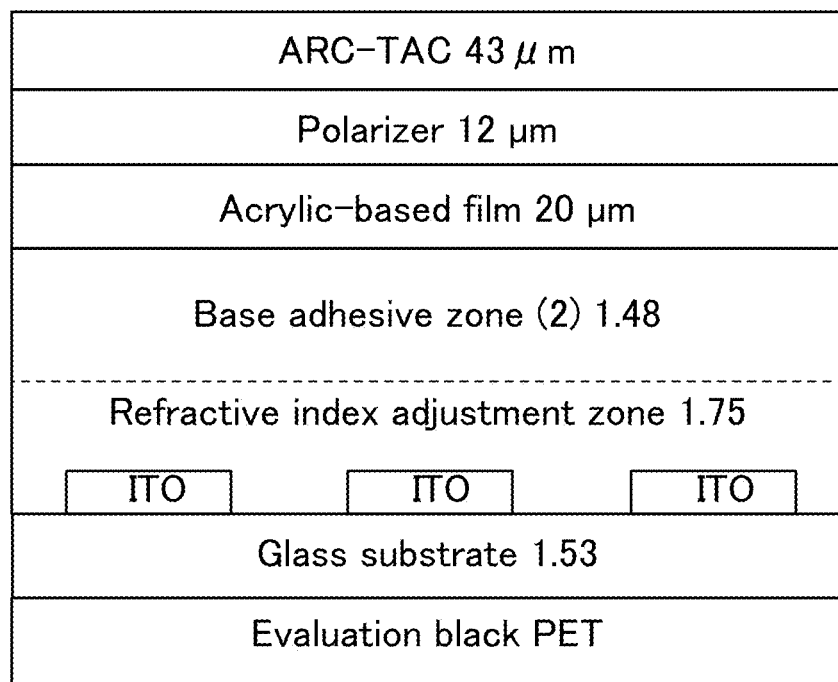
FIG. 12(a) is schematic diagram depicting a configuration of a polarizing film laminate in Inventive Example 4.

A film laminate was produced in the same manner as that in Inventive Example 2, except that the patterned transparent electroconductive layer-laminated element substrate (2) was used as the transparent electroconductive layer supporting substrate. A laminate configuration of the obtained film laminate in Inventive Example 4 is schematically depicted in FIG. 12(a).

Inventive Example 5

Figure 13A:
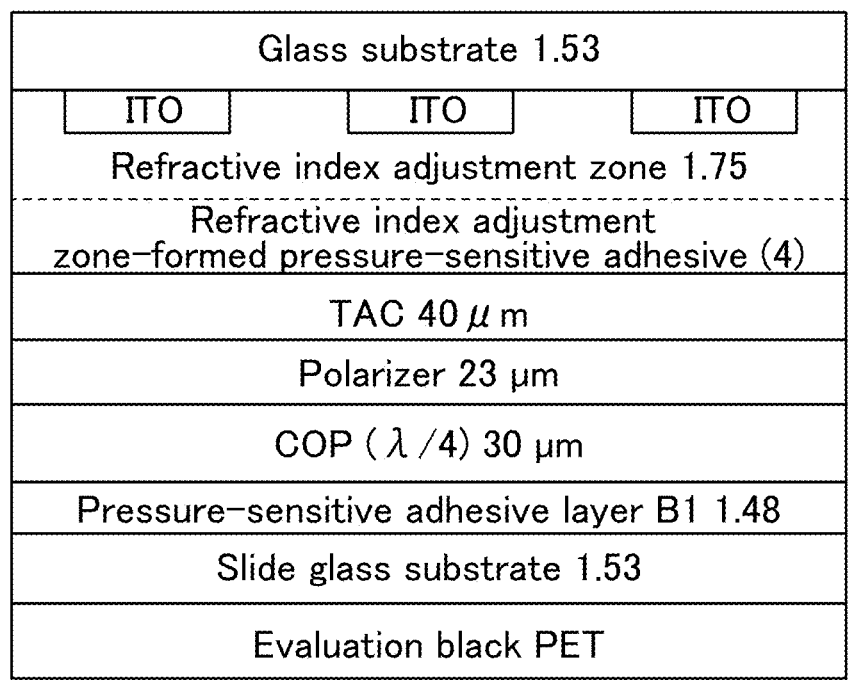
FIG. 13(a) is schematic diagram depicting a configuration of a polarizing film laminate in Inventive Example 5.

After peeling off the PET separator sheet on the base adhesive zone of the refractive index adjustment zone-formed pressure-sensitive adhesive layer (4), the resulting exposed surface of the refractive index adjustment zone-formed pressure-sensitive adhesive layer (4) was attached to the 40 μm-thick TAC film of the polarizing film (3) in such a manner that the refractive index adjustment zone faced outwardly. In the same way, after peeling off the PET separator sheet on one surface of the pressure-sensitive adhesive layer B1, the resulting exposed surface of the pressure-sensitive adhesive layer B1 was attached to a 30 μm-thick retardation film on a side opposite to the polarizing film (3) with respect to the pressure-sensitive adhesive layer B1 to form a polarizing film laminate (C). After peeling off the PET separator sheet on the refractive index adjustment zone of the produced polarizing film laminate (C), the exposed surface of the resulting polarizing film laminate (C) was attached to the transparent electroconductive layer of the patterned transparent electroconductive layer-laminated element substrate (2) in such a manner as to cause the refractive index adjustment zone (zone having the high refractive index material particles) of the polarizing film laminate to come into contact with the transparent electroconductive layer area (pattered area) and non-transparent electroconductive layer area (opening area) on the element substrate. Further, after peeling off the PET separator sheet on the other surface of the pressure-sensitive adhesive layer B1, the resulting exposed surface of the pressure-sensitive adhesive layer B1 was attached to a slide glass for surface protection and optical measurement, or a 100 μm-thick cycloolefin polymer film (trade name "ZEONOR ZF16", manufactured by ZEON Corporation, in-plane birefringence: 0.0001) to produce a display panel. A laminate configuration of the obtained film laminate in Inventive Example 5 is schematically depicted in FIG. 13(a).

Inventive Example 6

Figure 14A:
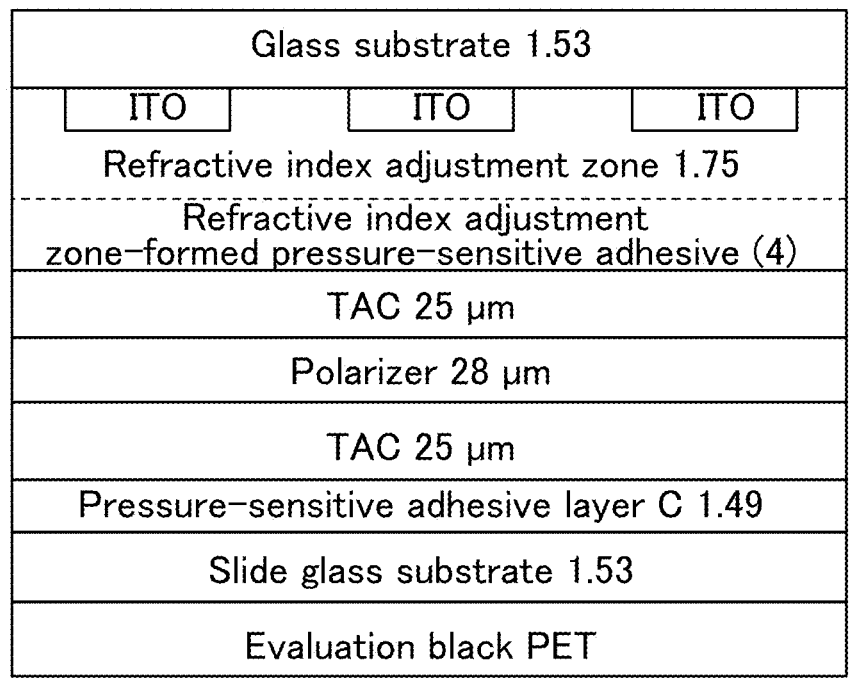
FIG. 14(a) is schematic diagram depicting a configuration of a polarizing film laminate in Inventive Example 6.

A film laminate was produced in the same manner as that in Inventive Example 5, except that the polarizing film and pressure-sensitive adhesive layer B1 devoid of the refractive index adjustment zone were changed, respectively, to the polarizing film (4) and the pressure-sensitive adhesive layer C, so as to produce a polarizing film laminate (D). A laminate configuration of the obtained film laminate in Inventive Example 6 is schematically depicted in FIG. 14(a).

Inventive Example 7

Figure 15A:
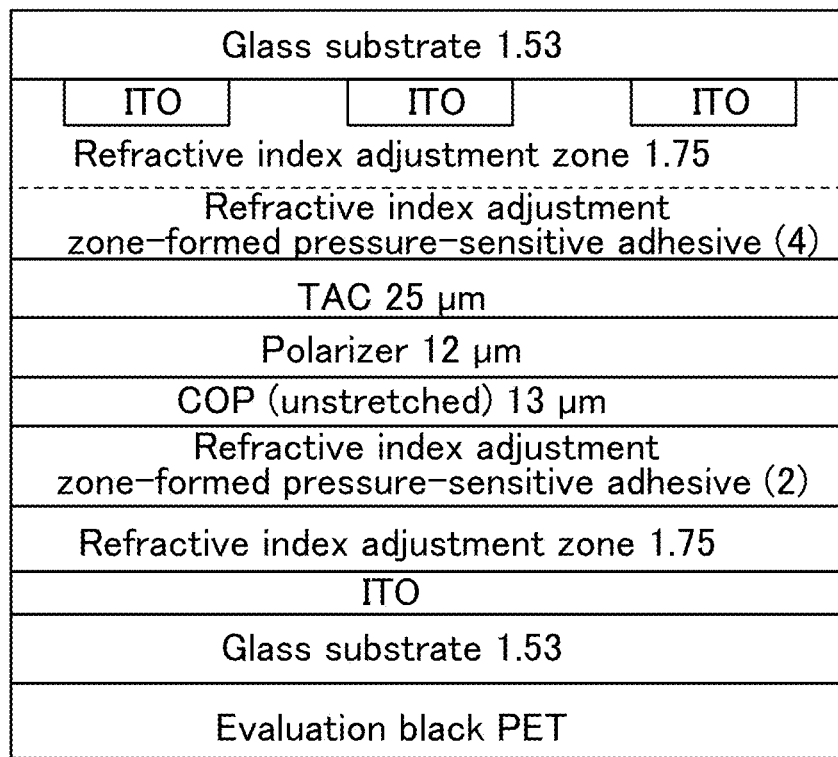
FIG. 15(a) is schematic diagram depicting a configuration of a polarizing film laminate in Inventive Example 7.

Among the conditions for Inventive Example 6, the polarizing film and the pressure-sensitive adhesive layer C were changed, respectively, to the polarizing film (5) and the refractive index adjustment zone-formed pressure-sensitive adhesive layer (2), and the refractive index adjustment zone-formed pressure-sensitive adhesive layer (2) was laminated to a 13 μm-thick unstretched COP film in such a manner that the refractive index adjustment zone thereof faced outwardly, to thereby produce a polarizing film laminate (E). After peeling off the PET separator sheet on the refractive index adjustment zone-formed pressure-sensitive adhesive layer (2) of the produced polarizing film laminate (E), the resulting exposed surface of the polarizing film laminate (D) was attached to the transparent electroconductive layer of the non-patterned transparent electroconductive layer-laminated element substrate (1) in such a manner as to cause the refractive index adjustment zone (zone having the high refractive index material particles) of the polarizing film laminate to come into contact with the transparent electroconductive layer. Then, after peeling off the PET separator sheet on the refractive index adjustment zone-formed pressure-sensitive adhesive layer (4) of the produced polarizing film laminate (E), the exposed surface of the resulting polarizing film laminate (E) was attached to the transparent electroconductive layer of the patterned transparent electroconductive layer-laminated element substrate (2) in such a manner as to cause the refractive index adjustment zone (zone having the high refractive index material particles) of the polarizing film laminate to come into contact with the transparent electroconductive layer area (pattered area) and non-transparent electroconductive layer area (opening area) on the element substrate. A laminate configuration of the obtained film laminate in Inventive Example 7 is schematically depicted in FIG. 15(a).

Inventive Example 8

Figure 16A:
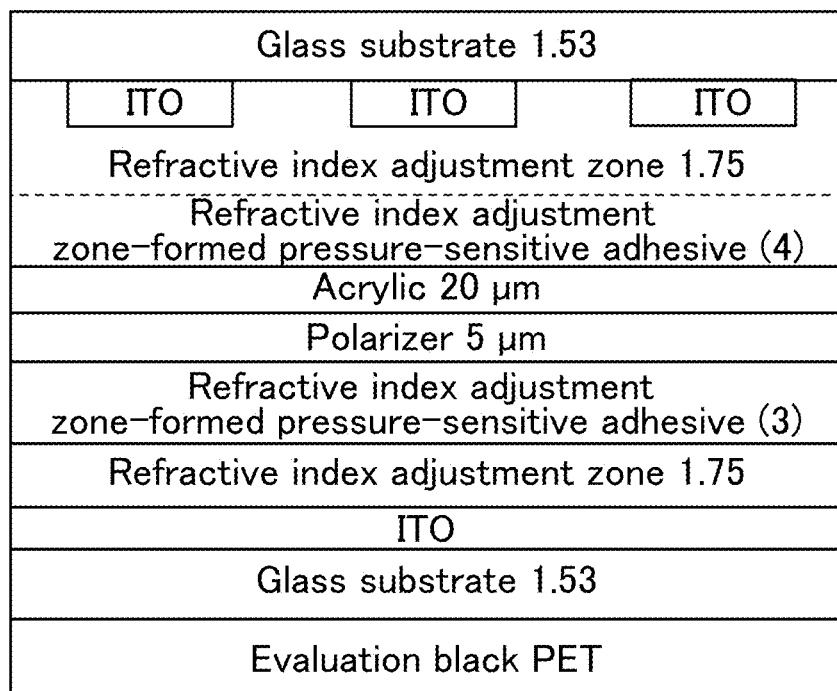
FIG. 16(a) is schematic diagram depicting a configuration of a polarizing film laminate in Inventive Example 8.

A film laminate was produced in the same manner as that in Inventive Example 7, except that the polarizing film and the refractive index adjustment zone-formed pressure-sensitive adhesive layer (2) were changed to the polarizing film (6), and the refractive index adjustment zone-formed pressure-sensitive adhesive layer (3), wherein, after peeling off the PET separator sheet on the refractive index adjustment zone, the resulting exposed surface was attached to a 5 μm-thick polarizer in such a manner that the refractive index adjustment zone faced outwardly, to thereby produce a polarizing film laminate (F). A laminate configuration of the obtained film laminate in Inventive Example 8 is schematically depicted in FIG. 16(a).

Comparative Example 1

A film laminate was produced in the same manner as that in Inventive Example 1, except that the refractive index adjustment zone-formed pressure-sensitive adhesive layer (1) was changed to the pressure-sensitive adhesive layer A devoid of the refractive index adjustment zone, to produce a polarizing film laminate (G). A laminate configuration of the obtained film laminate in Comparative Example 1 is schematically depicted in FIG. 9(b).

Comparative Example 2

A film laminate was produced in the same manner as that in Inventive Example 2, except that the refractive index adjustment zone-formed pressure-sensitive adhesive layer (2) was changed to the pressure-sensitive adhesive layer B1 devoid of the refractive index adjustment zone, to produce a polarizing film laminate (H). A laminate configuration of the obtained film laminate in Comparative Example 2 is schematically depicted in FIG. 10(b).

Comparative Example 3

Figure 11B:
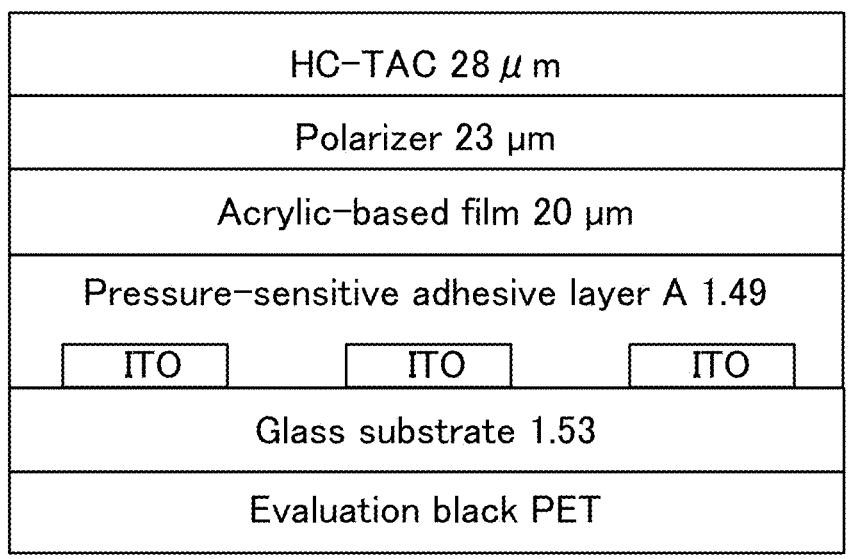
FIG. 11(b) is schematic diagram depicting a configuration of a polarizing film laminate in Comparative Example 3.

A film laminate was produced in the same manner as that in Comparative Example 1, except that the patterned transparent electroconductive layer-laminated element substrate (2) was used as the transparent electroconductive layer supporting substrate. A laminate configuration of the obtained film laminate in Comparative Example 3 is schematically depicted in FIG. 11(b).

Comparative Example 4

Figure 12B:
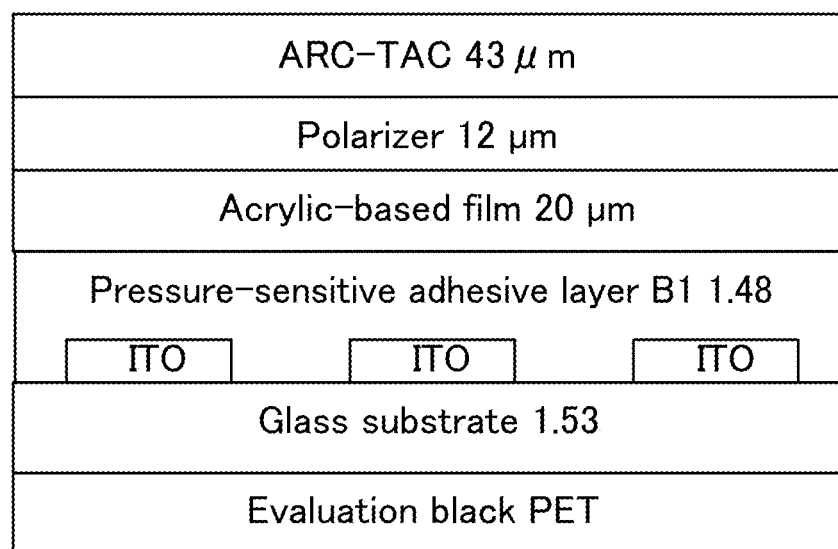
FIG. 12(b) is schematic diagram depicting a configuration of a polarizing film laminate in Comparative Example 4.

A film laminate was produced in the same manner as that in Comparative Example 2, except that the patterned transparent electroconductive layer-laminated element substrate (2) was used as the transparent electroconductive layer supporting substrate. A laminate configuration of the obtained film laminate in Comparative Example 4 is schematically depicted in FIG. 12(b).

Comparative Example 5

Figure 13B:
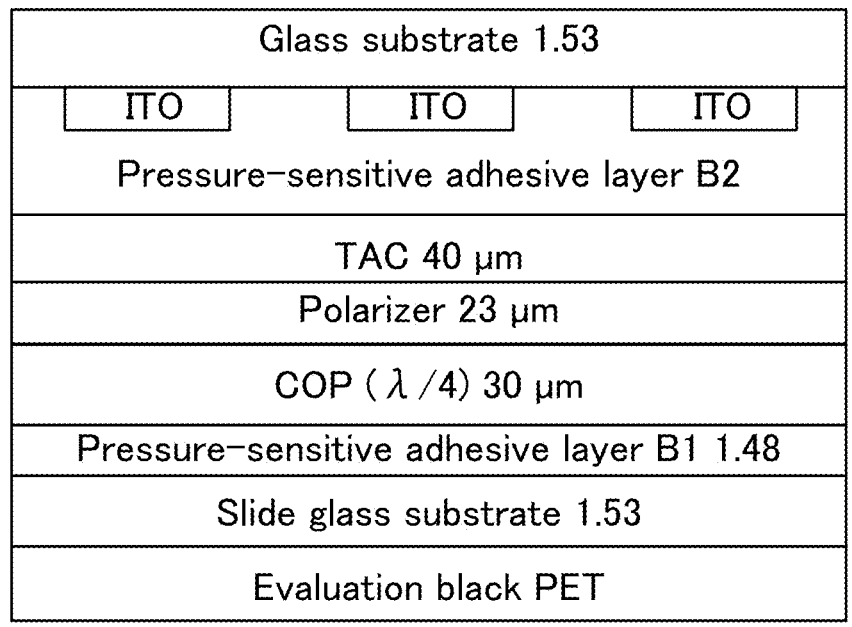
FIG. 13(b) is schematic diagram depicting a configuration of a polarizing film laminate in Comparative Example 5.

A film laminate was produced in the same manner as that in Inventive Example 5, except that the refractive index adjustment zone-formed pressure-sensitive adhesive layer (4) was changed to the pressure-sensitive adhesive layer B2 devoid of the refractive index adjustment zone, to produce a polarizing film laminate (I). A laminate configuration of the obtained film laminate in Comparative Example 5 is schematically depicted in FIG. 13(b).

Comparative Example 6

Figure 14B:
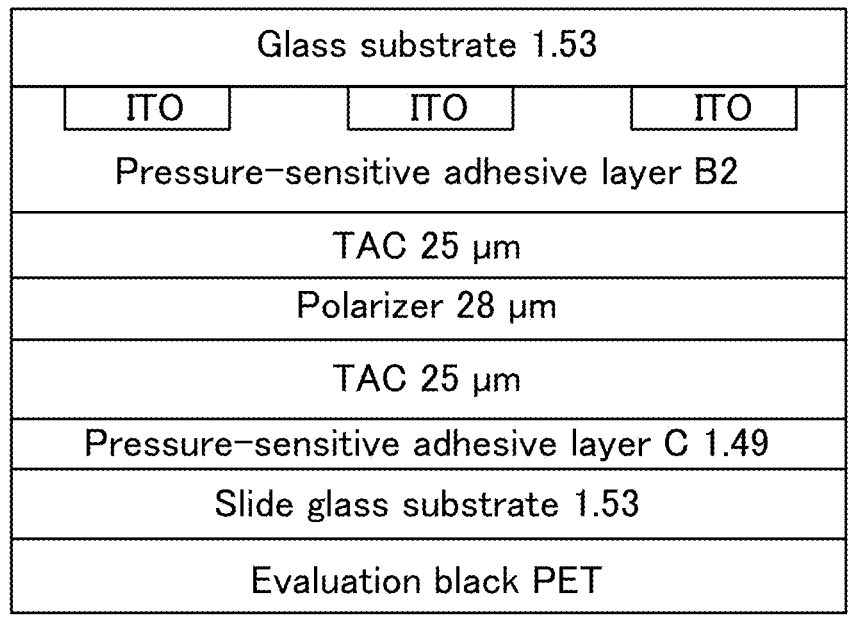
FIG. 14(b) is schematic diagram depicting a configuration of a polarizing film laminate in Comparative Example 6.

A film laminate was produced in the same manner as that in Inventive Example 6, except that the refractive index adjustment zone-formed pressure-sensitive adhesive layer (4) was changed to the pressure-sensitive adhesive layer B2 devoid of the refractive index adjustment zone, to A laminate configuration of the obtained film laminate in Comparative Example 6 is schematically depicted in FIG. 14(b).

Comparative Example 7

Figure 15B:
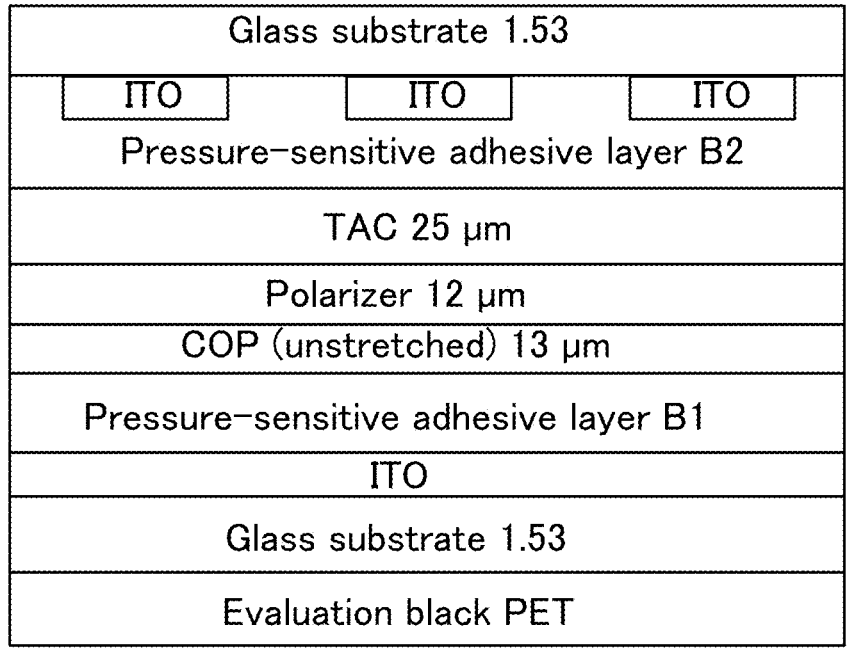
FIG. 15(b) is schematic diagram depicting a configuration of a polarizing film laminate in Comparative Example 7.

A film laminate was produced in the same manner as that in Inventive Example 7, except that the refractive index adjustment zone-formed pressure-sensitive adhesive layer (2) and the refractive index adjustment zone-formed pressure-sensitive adhesive layer (4) located on the opposite side with respect to the polarizer were changed to, respectively, the pressure-sensitive adhesive layer B1 and the pressure-sensitive adhesive layer B2 each devoid of the refractive index adjustment zone, and the pressure-sensitive adhesive layer B1 and the pressure-sensitive adhesive layer B2 were laminated, respectively, to the 13 μm-thick unstretched COP film and the 25 μm-thick TAC film, to produce a polarizing film laminate (K). A laminate configuration of the obtained film laminate in Comparative Example 7 is schematically depicted in FIG. 15(b).

Comparative Example 8

Figure 16B:
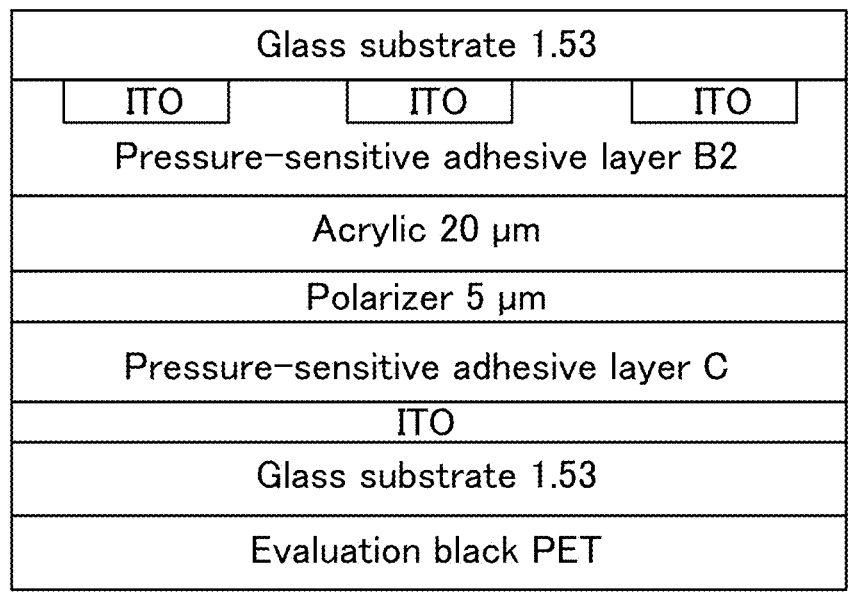
FIG. 16(b) is schematic diagram depicting a configuration of a polarizing film laminate in Comparative Example 8.

A film laminate was produced in the same manner as that in Inventive Example 8, except that the refractive index adjustment zone-formed pressure-sensitive adhesive layer (3) and the refractive index adjustment zone-formed pressure-sensitive adhesive layer (4) located on the opposite side with respect to the polarizer were changed to, respectively, the pressure-sensitive adhesive layer C and the pressure-sensitive adhesive layer B2 each devoid of the refractive index adjustment zone, and the pressure-sensitive adhesive layer C and the pressure-sensitive adhesive layer B2 were laminated, respectively, to the 5 μm-thick polarizer and the 20 μm-thick acrylic-based film, to produce a polarizing film laminate (L). A laminate configuration of the obtained film laminate in Comparative Example 8 is schematically depicted in FIG. 16(b).

[Evaluation Method]
<Measurement of Single Transmittance and Polarization Degree of Polarizer>

A single transmittance (Ts), a parallel transmittance (Tp) and a crossed transmittance (Tc) of a polarizer were measured using a UV-visible spectrophotometer (V7100 manufactured by JASCO Corporation), and a polarization degree (P) was derived from the following formula:

$$\text{Polarization degree } (P)(\%) = \{(Tp-Tc)/(Tp+Tc)\} \times (\frac{1}{2}) \times 100$$

Each value of Ts, Tp and Tc is a Y value measured by the 2-degree visual field (C light source) of JIS Z8701 and corrected for spectral luminous efficacy.

<Measurement of Weight Average Molecular Weight (Mw) of Acryl-Based Polymer>

A weight average molecular weight of the produced acryl-based polymer was measured by gel permeation chromatography (GPC).

Apparatus: HLC-8220 GPC manufactured by TOSOH CORPORATION
Column: Sample column; TSKguardcolumn Super HZ-H (one column) and TSKgel Super HZM-H (two columns), manufactured by TOSOH CORPORATION
Reference column; TSKgel Super H-RC (one column), manufactured by TOSOH CORPORATION Flow rate: 0.6 mL/min
Injection amount: 10 μL
Column temperature: 40° C.
Eluent: THF
Concentration of injected sample: 0.2 weight %
Detector: differential refractometer The weight average molecular weight was calculated in terms of polystyrene.

<Observation of Surface State of Pressure-Sensitive Adhesive Layer>

Figure 17:
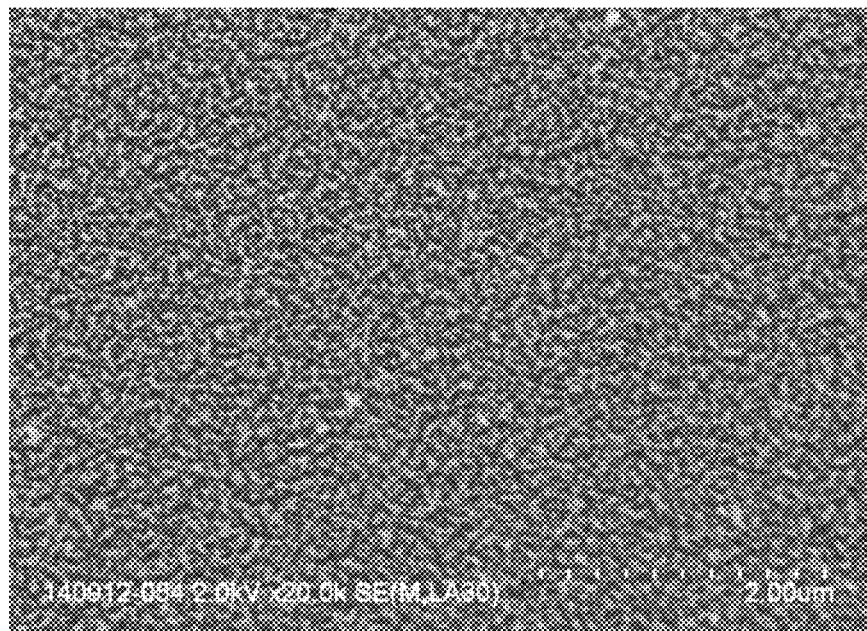
FIG. 17 is a 20000× SEM photograph presenting a surface state of a refractive index adjustment zone of a pressure-sensitive adhesive layer produced in one Inventive Example.

In each Inventive Example, the surface of the pressure-sensitive adhesive layer having the high refractive index material particles was observed using a field emission scanning electron microscope (FE-SEM) at an acceleration voltage of 2 kV, and at respective magnifications: 500 times, 2,000 times, 5,000 times and 20,000 times. A SEM photograph at a magnification of 20,000 times is presented in FIG. 17. The SEM photograph shows that the high refractive index material particles are uniformly dispersed.

<Observation of Gradation-Processed Microstructure>

Figure 18A:
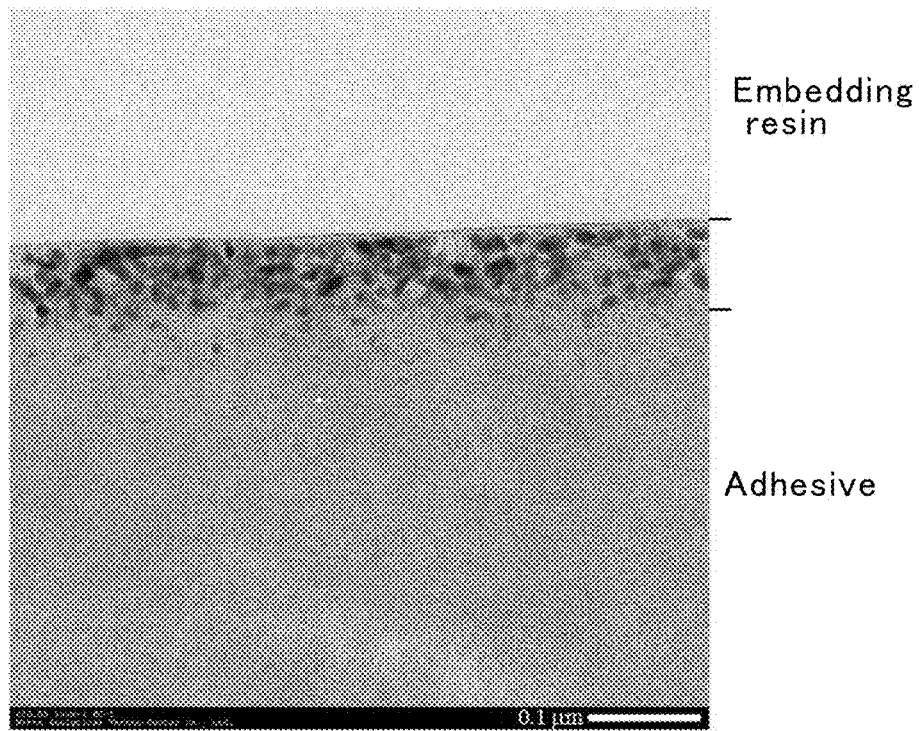
FIG. 18(a) is a 30000× TEM cross-sectional photographs presenting a high refractive index material particle distribution in a refractive index adjustment zone of a pressure-sensitive adhesive layer obtained in one Inventive Example.
Figure 18B:
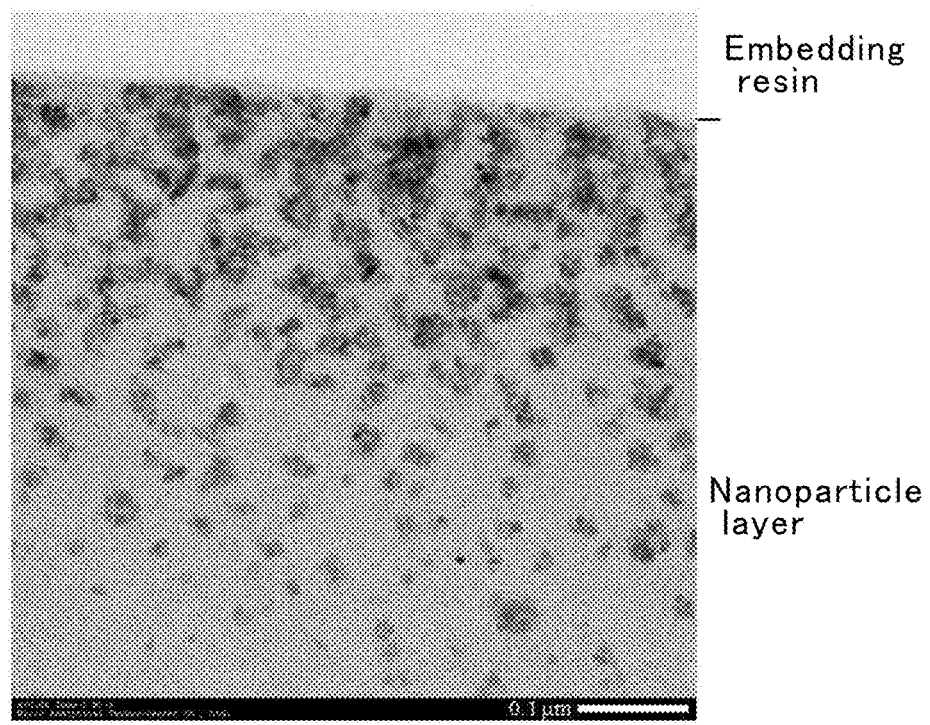
FIG. 18(b) is a 30000× TEM cross-sectional photographs presenting a high refractive index material particle distribution in a refractive index adjustment zone of a pressure-sensitive adhesive layer obtained in another Inventive Example.

In two Inventive Examples, a cross-section adjacent to the surface of the pressure-sensitive adhesive layer having the high refractive index material particles was observed using a transmission electron microscope (TEM) at a magnification of 30,000 times. Results of the observation are presented in FIGS. 18(a) and 18(b). FIG. 18(a) shows that the high refractive index material particles are approximately uniformly distributed over approximately the entire thickness of the refractive index adjustment zone, whereas FIG. 18(b) shows that a distribution density of the high refractive index material particles in the pressure-sensitive adhesive layer is maximized at one surface of the pressure-sensitive adhesive layer, and gradually reduced toward the other surface in a thickness direction of the pressure-sensitive adhesive layer.

<Average Interfacial Refractive Index>

An average interfacial refractive index of the pressure-sensitive adhesive layers obtained in Inventive and Comparative Examples was calculated by measuring refractive indexes in the sodium D-lines (589 nm) using a spectroscopic ellipsometer ("EC-400" manufactured by JA. Woolam Co.). In each of the pressure-sensitive adhesive layers of Inventive and Comparative Examples, the separator sheets on the opposite surfaces of the pressure-sensitive adhesive layer were peeled off, and a black plate was laminated to a non-particle infiltration-side one of the surfaces. In this state, an average interfacial refractive index of the other surface, i.e., the particle infiltration-side surface, was measured. On the other hand, in each of the matrix material-based pressure-sensitive adhesive layers of Comparative Examples, two separator sheets on respective opposite surfaces of the pressure-sensitive adhesive layer were peeled off, and then a black plate was laminated to one of the surfaces. In this state, an average interfacial refractive index of the other surface of the pressure-sensitive adhesive layer was measured.

<Measurement of Thickness of Refractive Index Adjustment Layer>

A cross-section of the pressure-sensitive adhesive layer in a depth direction was adjusted to perform TEM observation. Based on the resulting TEM image (direct magnification: 3,000 to 30,000 times), a thickness of the refractive index adjustment layer was measured. The thickness of the refractive index adjustment layer was determined as an average value of undulation of the interface between the base adhesive layer and the refractive index adjustment layer. In a situation where it was difficult to identify the interface between the base adhesive layer and the refractive index adjustment layer, an interfacial TEM image was subjected to binary image processing using image processing software (ImageJ), and a depth in a region where 90% of the nanoparticles exists was determined as the thickness of the refractive index adjustment layer.

<Area Ratio of High Refractive Index Material Particles>

The particle infiltration-side surface of the pressure-sensitive adhesive layer was observed using Fe-SEM at an acceleration voltage of 2 kV, and at respective magnifications: 500 times, 2,000 times and 5,000 times. The resulting interfacial TEM image was subjected to binary image processing using image processing software (ImageJ) to measure an area of the high refractive index material particles in a rectangular region having a long side length of 23 μm and a short side length of 18 μm so as to calculate an area ratio (%) of the high refractive index material particles to the entire rectangular region.

<Total Light Transmittance & Haze Value>

In each of the pressure-sensitive adhesive sheets obtained in Inventive and Comparative Examples, a particle infiltration-side one of the separator sheets was peeled off, and the resulting exposed surface was attached to a glass slide (trade name: "ShiroKenma No. 1", manufactured by Matsunami Glass Ind., Ltd., thickness: 0.8 to 1.0 mm, total light transmittance: 92%, haze: 0.2%). Then, the other separator sheet was further peeled off to produce a test piece having a three-layer structure of a layer of the base adhesive zone, a layer of the refractive index adjustment zone and a layer of the glass slide. On the other hand, in each of the pressure-sensitive adhesive sheets obtained in Comparative Examples, one of the separator sheets was peeled off, and the resulting exposed surface was attached to a glass slide (trade name: "ShiroKenma No. 1", manufactured by Matsunami Glass Ind., Ltd., thickness: 0.8 to 1.0 mm, total light transmittance: 92%, haze: 0.2%). Then, the other separator sheet was further peeled off to prepare a test piece having a two-layer structure of a layer of the base pressure-sensitive adhesive material and a layer of the glass slide. For each of the test pieces, a total light transmittance and a haze value in a visual light range was measured using a haze meter (device name: HM-150, manufactured by Murakami Color Research Laboratory Co., Ltd).

<Adhesive Force During 180-Degree Peeling (Adhesive Force with Respect to Glass Plate During 180-Degree Peeling>

A sheet piece having a length of 100 mm and a width of 25 mm was cut from each of the sheets obtained in Inventive and Comparative Examples. Then, in each of the sheet pieces of Inventive and Comparative Examples, a non-particle infiltration-side one of the separator sheets was peeled off, and a PET film (trade name: "LUMIRROR S-10", manufactured by TORAY Industries Inc., thickness: 25 μm) was attached (lined) to the exposed surface. On the other hand, in each of the sheet pieces of Comparative Examples 1 and 2, one of the separator sheets was peeled off, and a PET film (trade name: "LUMIRROR S-10", manufactured by TORAY Industries Inc., thickness: 25 μm) was attached (lined) to the exposed surface. Then, the other separator sheet was peeled off, and then the sheet piece was press-bonded to a glass plate (trade name: "Soda-Lime Glass #0050", manufactured by Matsunami Glass Ind., Ltd.) as a test plate, under press-bonding conditions: 2 kg roller; and one stroke, to produced a sample having a three-layer structure of a layer of the test plate, a layer of the base pressure-sensitive adhesive material and a layer of the PET film.

Each of the obtained samples was subjected to an autoclave treatment (50° C., 0.5 MPa, 15 minutes), and then subjected to cooling in an atmosphere at 23° C. and 50% R.H., for 30 minutes. After the cooling, the pressure-sensitive adhesive sheet (the pressure-sensitive adhesive layer and the PET film) was peeled off from the test plate to measure an adhesive force (N/25 mm) during 180-degree peeling, using a tension tester (device name: Autograph, manufactured by Shimadzu Corp.) according to JIS Z0237, in an atmosphere at 23° C. and 50% R.H., under conditions: tension rate=300 mm/minute; and peeling angle=180 degrees. Further, in each of Inventive and Comparative Examples, a matrix material-based pressure-sensitive adhesive sheet before the infiltration of the high refractive index material particles was prepared, and an adhesive force during 180-degree peeling was measured in the same manner as above.

<Transmittance of High Refractive Index Particle-Containing Dispersion Liquid>

A transmittance of the high refractive index particle-containing dispersion liquid was measured by a photoelectrometer (AC-114 manufactured by Optima Inc.) using a 530 nm filter. On the assumption that a transmittance of the dispersion medium itself is 100%, a transmittance (%) of each of the dispersion liquids used in Inventive and Comparative Examples was calculated.

<Measurement of Reflection Suppression Ratio>

One of the opposite surfaces of each of the optical element laminates in Inventive and Comparative Examples was defined as a reflectance measuring surface, and a single-faced pressure-sensitive adhesive black RET (PET75NBPET38, manufactured by Lintec Corp.) was attached to the other surface to produce a sample for reflectance measurement.

A reflectance (Y value) of each of the optical element laminates on the side of the reflectance measuring surface was measured by a reflection spectrophotometer (U4100, manufactured by Hitachi High-Technologies Corp.). The measurement was performed at respective positions corresponding to an etched area and a non-etched area of the transparent electroconductive layer. That is, in the etched area (opening) of the transparent electroconductive layer, a reflectance at an interface between the refractive index adjustment layer of the pressure-sensitive adhesive layer and the element substrate of the optical element laminate is measured. Further, in the non-etched area (patterned portion) of the transparent electroconductive layer, a reflectance at an interface between the refractive index adjustment layer of the pressure-sensitive adhesive layer and the transparent electroconductive layer is measured.

For each of the etched area and the non-etched area, a reflection suppression ratio was calculated based on the following formula. In the following formula, "reflectance (%) in case devoid of the particles" means a reflectance of each of the optical element laminates in Comparative Examples (using no particle). That is, the reflection suppression ratio is an index indicating how much the reflectance can be reduced by providing the refractive index adjustment layer.

Reflection suppression ratio (%)=reflectance (%)−reflectance (%) in case devoid of the particles A reflected color (b*) improvement rate was calculated for each of the etched area based on the following formula:
Reflected color (b*) improvement rate=Reflected color (b*) value−Reflected color (b*) value in case devoid of the particles. In the above formula, the "reflected color (b*) value in case devoid of the particles" means reflected color (b*) of the optical element laminate in each Comparative Example (in the case of using no particle). That is, the reflection suppression rate is an index indicating how much the reflected color (b*) as an index of blue could be improved toward a neutral side by providing the refractive index adjustment zone.

<Determination on Pattern Invisibility>

Evaluation on pattern visibility was determined based on a difference in reflectance between a portion of the electroconductive layer and a portion devoid of the electroconductive layer. When the difference in reflectance was within ±0.3%, the polarizing film laminate was evaluated as ○, and when the difference in reflectance was from ±0.3 to less than 1.0%, the polarizing film laminate was evaluated as Δ. Further, when the color difference in reflected color was equal to or greater than ±0.3, the polarizing film laminate was evaluated as x.

Configurations of the polarizing film laminates in Inventive Examples 1 to 8 and Comparative Examples 1 to 8 are presented in Table 3. Further, results of the evaluations in Inventive Examples 1 to 8 and Comparative Examples 1 to 8 are presented in Table 4.

TABLE 3

| | Polarizing Film Laminate | Electroconductive Layer Outside Polarizer | Pressure-sensitive Adhesive (outside) | | Polarizing Film | Pressure-Sensitive Adhesive (inside) | | Electroconductive Layer Inside Polarizer |
| --- | --- | --- | --- | --- | --- | --- | --- | --- |
| | | | Type | Thickness | | Type | Thickness | |
| Inventive Example 1 | Polarizing film laminate (A) | — | — | — | Polarizing film (1) | Pressure-sensitive adhesive layer (1) | 25 | (1)/Non-patterned |
| Inventive Example 2 | Polarizing film laminate (B) | — | — | — | Polarizing film (2) | Pressure-sensitive adhesive layer (2) | 25 | (1)/Non-patterned |
| Inventive Example 3 | Polarizing film laminate (A) | — | — | — | Polarizing film (1) | Pressure-sensitive adhesive layer (1) | 25 | (2)/Patterned |
| Inventive Example 4 | Polarizing film laminate (B) | — | — | — | Polarizing film (2) | Pressure-sensitive adhesive layer (2) | 25 | (2)/Patterned |
| Inventive Example 5 | Polarizing film laminate (C) | (2)/Patterned | Pressure-sensitive adhesive layer (4) | 150 | Polarizing film (3) | Pressure-sensitive adhesive layer B1 | 25 | — |
| Inventive Example 6 | Polarizing film laminate (D) | (2)/Patterned | Pressure-sensitive adhesive layer (4) | 150 | Polarizing film (4) | Pressure-sensitive adhesive layer C | 23 | — |
| Inventive Example 7 | Polarizing film laminate (E) | (2)/Patterned | Pressure-sensitive adhesive layer (4) | 150 | Polarizing film (5) | Pressure-sensitive adhesive layer (2) | 25 | (1)/Non-patterned |
| Inventive Example 8 | Polarizing film laminate (F) | (2)/Patterned | Pressure-sensitive adhesive layer (4) | 150 | Polarizing film (6) | Pressure-sensitive adhesive layer (3) | 23 | (1)/Non-patterned |
| Comparative Example 1 | Polarizing film laminate (G) | — | — | — | Polarizing film (1) | Pressure-sensitive adhesive layer A | 25 | (1)/Non-patterned |

TABLE 3-continued

| | Polarizing Film Laminate | Electroconductive Layer Outside Polarizer | Pressure-sensitive Adhesive (outside) Type | Thickness | Polarizing Film | Pressure-Sensitive Adhesive (inside) Type | Thickness | Electroconductive Layer Inside Polarizer |
|---|---|---|---|---|---|---|---|---|
| Comparative Example 2 | Polarizing film laminate (H) | — | — | — | Polarizing film (2) | Pressure-sensitive adhesive layer B1 | 25 | (1)/Non-patterned |
| Comparative Example 3 | Polarizing film laminate (G) | — | — | — | Polarizing film (1) | Pressure-sensitive adhesive layer A | 25 | (2)/Patterned |
| Comparative Example 4 | Polarizing film laminate (H) | — | — | — | Polarizing film (2) | Pressure-sensitive adhesive layer B1 | 25 | (2)/Patterned |
| Comparative Example 5 | Polarizing film laminate (I) | (2)/Patterned | Pressure-sensitive adhesive layer B2 | 150 | Polarizing film (3) | Pressure-sensitive adhesive layer B1 | 25 | — |
| Comparative Example 6 | Polarizing film laminate (J) | (2)/Patterned | Pressure-sensitive adhesive layer B2 | 150 | Polarizing film (4) | Pressure-sensitive adhesive layer C | 23 | — |
| Comparative Example 7 | Polarizing film laminate (K) | (2)/Patterned | Pressure-sensitive adhesive layer B2 | 150 | Polarizing film (5) | Pressure-sensitive adhesive layer B1 | 25 | (1)/Non-patterned |
| Comparative Example 8 | Polarizing film laminate (L) | (2)/Patterned | Pressure-sensitive adhesive layer B2 | 150 | Polarizing film (6) | Pressure-sensitive adhesive layer C | 23 | (1)/Non-patterned |

TABLE 4

| | Reflectance Characteristics | | | | | | | |
|---|---|---|---|---|---|---|---|---|
| | Electroconductive layer area | | | | Non-electroconductive layer area | | | Outermost Layer during Reflectance Measurement in Examples |
| | Reflectance (Y %) | Reflected color b* | Reflectance Improvement effect | Color b* Improvement effect | Reflectance (Y %) | Difference in reflectance from electroconductive layer area (%) | Pattern Invisibility | Note |
| Inventive Example 1 | 5.3 | −0.9 | −0.2 | 0.7 | — | — | | Inside | HC layer |
| Inventive Example 2 | 2.1 | 0.8 | −0.2 | 3.1 | — | — | | Inside | ARC layer |
| Inventive Example 3 | 5.3 | −0.9 | −0.3 | 0.7 | 5.2 | 0.0 | ○ | Inside | HC layer |
| Inventive Example 4 | 2.1 | 0.8 | −0.2 | 3.1 | 2.2 | −0.1 | ○ | Inside | ARC layer |
| Inventive Example 5 | 5.6 | 0.0 | −0.2 | 4.5 | 5.3 | 0.3 | ○ | Outside | Glass |
| Inventive Example 6 | 5.7 | −0.1 | −0.2 | 4.5 | 5.4 | 0.3 | ○ | Outside | Glass |
| Inventive Example 7 | 6.6 | 0.2 | −0.4 | 7.1 | 6.3 | 0.3 | ○ | Both sides | Glass |
| Inventive Example 8 | 6.7 | −1.8 | −0.2 | 5.0 | 6.5 | 0.2 | ○ | Both sides | Glass |
| Comparative Example 1 | 5.5 | −1.6 | — | — | — | — | | Inside | HC layer |
| Comparative Example 2 | 2.3 | −2.3 | — | — | — | — | | Inside | ARC layer |
| Comparative Example 3 | 5.6 | −1.6 | — | — | 5.1 | 0.5 | Δ | Inside | HC layer |
| Comparative Example 4 | 2.3 | −2.3 | — | — | 1.8 | 0.5 | Δ | Inside | ARC layer |
| Comparative Example 5 | 5.8 | −4.5 | — | — | 4.8 | 1.0 | x | Outside | Glass |
| Comparative Example 6 | 5.9 | −4.6 | — | — | 4.8 | 1.1 | x | Outside | Glass |
| Comparative Example 7 | 7.0 | −6.9 | — | — | 5.9 | 1.1 | x | Both sides | Glass |
| Comparative Example 8 | 6.9 | −6.8 | — | — | 5.8 | 1.1 | x | Both sides | Glass |

Comparing the evaluation results of Examples 1 to 8 with the evaluation results of Comparative Examples 1 to 8, it can be understood that the use of the refractive index adjustment zone-formed pressure-sensitive adhesive layer makes it possible to lower the reflectance by 0.2% to 0.4%. In addition, the use of the refractive index adjustment zone-formed pressure-sensitive adhesive layer makes it possible to improve the color b*, and enables reflected light to come close to solid color, thereby providing improved visibility. Furthermore, as can be understood from the comparison between the evaluation results of Examples 1 to 8 and the evaluation results of Comparative Examples 1 to 8, the use of the refractive index adjustment zone-formed pressure-sensitive adhesive layer makes it possible to improve the problem "poor pattern invisibility".

INDUSTRIAL APPLICABILITY

As mentioned above, in the present invention, in the pressure-sensitive adhesive layer for bonding a first optical element to a second optical element, the refractive index adjustment zone having a refractive index greater than a refractive index of the base pressure-sensitive adhesive material is formed over a given range from a surface of the pressure-sensitive adhesive layer on the side of the second optical element, in the thickness direction of the pressure-sensitive adhesive layer, so that it becomes possible to suppress the situation where internal reflections of external light are returned through the first optical element. The present invention can be applied to an optical display device, such as a liquid crystal display device and an organic EL display device. In particular, the present invention can be advantageously applied to a touch panel type display device having a touch sensor.

LIST OF REFERENCE SIGNS

S: pressure-sensitive adhesive sheet
S1, S2: support (backing)
1: optical element laminate
2: first optical element
3, 13: transparent pressure-sensitive adhesive layer
3a, 13a: base adhesive zone
3b, 13b: refractive index adjustment zone
4: second optical element
7: transparent electroconductive layer
17: high refractive index material particles
19: dispersion liquid
20: matrix material-based pressure-sensitive adhesive layer
21, 31: sub-laminate
22: COP element substrate
23: refractive index adjustment layer
24: ITO layer
25: pressure-sensitive adhesive layer
26: glass window
40: polarizing film laminate
41: polarizer
42, 43: protective film
50, 51, 52: optical film laminate
53: transparent electroconductive layer
60: liquid crystal panel
61: liquid crystal cell
62: antistatic layer
70: touch panel
71: touch sensor-attached liquid crystal cell
72: transparent electroconductive layer
80: touch panel
81: liquid crystal cell/organic EL cell
82: transparent electroconductive layer
83: touch sensor
90: touch panel
91: display cell
92: antistatic layer
93: transparent electroconductive layer
94: touch sensor

The invention claimed is:

1. A polarizing film laminate comprising a pressure-sensitive adhesive layer, and a polarizing film on a principal surface of the pressure-sensitive adhesive layer,
wherein the adhesive layer comprises:
a base adhesive zone made essentially of a transparent base pressure-sensitive adhesive material and formed over a given range from one principal surface of the pressure-sensitive adhesive layer in a thickness direction of the pressure-sensitive adhesive layer; and
a refractive index adjustment zone formed over a given range from the other principal surface of the pressure-sensitive adhesive layer in the thickness direction and comprising the base pressure-sensitive adhesive material and material infiltrated into the base pressure-sensitive adhesive material and different from the base pressure-sensitive adhesive material, the refractive index adjustment zone having an average refractive index greater than a refractive index of the base pressure-sensitive adhesive material,
and wherein the base pressure-sensitive adhesive material zone of the pressure-sensitive adhesive layer is located on the side of the polarizing film.

2. The polarizing film laminate as recited in claim 1, wherein the refractive index adjustment zone has a thickness of 20 nm to 600 nm.

3. The polarizing film laminate as recited in claim 1, wherein the different material is particles of a high refractive index material having a refractive index greater than that of the base pressure-sensitive adhesive material.

4. The polarizing film laminate as recited in claim 3, wherein the refractive index of the high refractive index material particles is in the range of 1.60 to 2.74.

5. The polarizing film laminate as recited in claim 3, wherein the other principal surface of the refractive index adjustment zone thereof is formed such that it has a region on which the high refractive index material particles are partially exposed, and a matrix region on which the pressure-sensitive adhesive material of the refractive index adjustment zone is partially exposed.

6. The polarizing film laminate as recited in claim 3, wherein the high refractive index material has an average primary particle size of 3 to 100 nm as measured by TEM observation.

7. The polarizing film laminate as recited in claim 3, wherein a difference between the refractive index of the high refractive index material particles and the refractive index of the base pressure-sensitive adhesive material is in the range of 0.15 to 1.34.

8. The polarizing film laminate as recited in claim 3, wherein the high refractive index material is one or more compounds selected from the group consisting of $TiO_2$, $ZrO_2$, $CeO_2$, $Al_2O_3$, $BaTiO_3$, $Nb_2O_5$ and $SnO_2$.

9. The polarizing film laminate as recited in claim 1, wherein the refractive index adjustment zone is formed by adding, to a pressure-sensitive adhesive material identical to the base pressure-sensitive adhesive material, an organic material having a refractive index greater than that of the pressure-sensitive adhesive material, in the form of particle, polymer or oligomer, to thereby increase an average refractive index of the refractive index adjustment zone.

10. The polarizing film laminate as recited in claim 9, wherein the refractive index of the base pressure-sensitive adhesive material is in the range of 1.40 to 1.55, and the refractive index of the organic material is in the range of 1.59 to 2.04.

11. The polarizing film laminate as recited in claim 1, wherein the pressure-sensitive adhesive layer has a total light transmittance of 80% or more.

12. The polarizing film laminate as recited in claim 3, wherein the high refractive index material particles partially exist in the form of an aggregate arising from aggregation of two or more thereof.

13. The polarizing film laminate as recited in claim 3, wherein the refractive index adjustment zone exists with irregular depths in the thickness direction of the pressure-sensitive adhesive layer.

14. The polarizing film laminate as recited in claim 1, which is attached to an antistatic layer located on a viewing-side principal surface of a liquid crystal cell.

15. The polarizing film laminate as recited in claim 14, wherein the refractive index of the refractive index adjustment zone is equal to or less than a refractive index of the antistatic layer.

16. The polarizing film laminate as recited in claim 14, wherein the antistatic layer comprises a primary component consisting of indium tin oxide, and wherein the refractive index of the base pressure-sensitive adhesive material is in the range of 1.40 to 1.55, and the refractive index of the refractive index adjustment zone is in the range of 1.50 to 1.80.

17. A liquid crystal panel comprising:
the polarizing film laminate as recited in claim 1;
a liquid crystal cell; and
an antistatic layer formed on a viewing-side principal surface of the liquid crystal cell,
wherein the other principal surface of the pressure-sensitive adhesive layer defined by the refractive index adjustment zone thereof in the polarizing film laminate is attached to the antistatic layer.

18. The liquid crystal panel as recited in claim 17, wherein the refractive index of the refractive index adjustment zone is equal to or less than a refractive index of the antistatic layer.

19. The liquid crystal panel as recited in claim 17, wherein the antistatic layer is made of indium tin oxide, and wherein the refractive index of the base pressure-sensitive adhesive material is in the range of 1.40 to 1.55, and the refractive index of the refractive index adjustment zone is in the range of 1.50 to 1.80.

20. The polarizing film laminate as recited in claim 1, which is attached to a transparent electroconductive layer formed on a viewing-side principal surface of a liquid crystal cell and patterned so as to function as a touch sensor by itself or in cooperation with the liquid crystal cell, and the viewing-side principal surface of the liquid crystal cell.

21. The polarizing film laminate as recited in claim 20, wherein the refractive index of the refractive index adjustment zone is less than a refractive index of the transparent electroconductive layer.

22. A liquid crystal panel comprising:
the polarizing film laminate as recited in claim 1;
a liquid crystal display cell;
a transparent electroconductive layer formed on a viewing-side principal surface of the liquid crystal display cell and patterned so as to function as a touch sensor by itself or in cooperation with the liquid crystal panel,
wherein the other principal surface of the pressure-sensitive adhesive layer defined by the refractive index adjustment zone thereof in the polarizing film laminate is attached to the transparent electroconductive layer and the viewing-side principal surface of the liquid crystal cell.

23. The liquid crystal panel as recited in claim 22, wherein the refractive index of the refractive index adjustment zone is less than a refractive index of the transparent electroconductive layer.

24. The liquid crystal panel as recited in claim 22, wherein the transparent electroconductive layer is made of indium tin oxide, and the viewing-side principal surface of the liquid crystal cell is defined by a glass substrate, wherein the refractive index of the refractive index adjustment zone is in the range of 1.60 to 1.80.

25. The polarizing film laminate as recited in claim 1, which further comprises a second pressure-sensitive adhesive layer on one surface of the polarizing film on a side opposite to the first pressure-sensitive adhesive layer.

26. The polarizing film laminate as recited in claim 25, wherein: the other principal surface of the pressure-sensitive adhesive layer defined by the refractive index adjustment zone thereof in the polarizing film laminate is attached to a viewing-side surface-defining element substrate, and a transparent electroconductive layer formed on the viewing-side surface-defining element substrate and patterned so as to function as a touch sensor; and the second pressure-sensitive adhesive layer of the polarizing film laminate is laminated to a display cell composed of a liquid crystal cell or an organic EL cell, and wherein refractive index of the refractive index adjustment zone is less than respective refractive indexes of the viewing-side surface-defining element substrate and the transparent electroconductive layer.

27. A display panel comprises:
the polarizing film laminate as recited in claim 25;
a display cell composed of a liquid crystal cell or an organic EL cell;
a viewing-side surface-defining element substrate; and
a transparent electroconductive layer formed on a principal surface of the viewing-side surface-defining element substrate and patterned so as to function as a touch sensor,
wherein: the other principal surface of the pressure-sensitive adhesive layer defined by the refractive index adjustment zone thereof is attached to the transparent electroconductive layer and the principal surface of the viewing-side surface-defining element substrate; and the second pressure-sensitive adhesive layer is laminated to the display cell.

28. The display panel as recited in claim 27, wherein the refractive index of the refractive index adjustment zone is less than a refractive index of the transparent electroconductive layer.

29. The display panel as recited in claim 27, wherein the refractive index of the refractive index adjustment zone is in the range of 1.60 to 1.80.

30. The polarizing film laminate as recited in claim 25, wherein the second pressure-sensitive adhesive layer comprises:
a base adhesive zone made of a transparent base pressure-sensitive adhesive material and formed over a given range from one principal surface of the second pressure-sensitive adhesive layer in a thickness direction of the second pressure-sensitive adhesive layer; and
a refractive index adjustment zone formed over a given range from the other principal surface of the second pressure-sensitive adhesive layer in the thickness direction and comprising the base pressure-sensitive adhesive material and material infiltrated into the base pressure-sensitive adhesive material and different from the base pressure-sensitive adhesive material, the refractive index adjustment zone having an average refractive index greater than a refractive index of the base pressure-sensitive adhesive material,
and wherein the base pressure-sensitive adhesive material zone of the second pressure-sensitive adhesive layer is located on the side of the polarizing film.

31. The polarizing film laminate as recited in claim 30, which is used for production of a liquid crystal panel, wherein:

the other principal surface of the first pressure-sensitive adhesive layer defined by the refractive index adjustment zone thereof is attached to a transparent electroconductive layer formed on a viewing-side surface-defining element substrate and patterned so as to function as a touch sensor, and the viewing-side surface-defining element substrate; and the other principal surface of the second pressure-sensitive adhesive layer defined by the refractive index adjustment zone thereof in the polarizing film laminate is attached to an antistatic layer, and wherein:

the refractive index of the refractive index adjustment zone of the first pressure-sensitive adhesive layer is less than a refractive index of the transparent electroconductive layer; and the refractive index of the refractive index adjustment zone of the second pressure-sensitive adhesive layer is less than a refractive index of the antistatic layer.

32. A liquid crystal panel comprises:

the polarizing film laminate as recited in claim 30;

a liquid crystal cell;

an antistatic layer formed on the liquid crystal cell;

a viewing-side surface-defining element substrate; and a transparent electroconductive layer formed on a principal surface of the viewing-side surface-defining element substrate and patterned so as to function as a touch sensor, wherein:

the other principal surface of the first pressure-sensitive adhesive layer defined by the refractive index adjustment zone thereof is attached to the transparent electroconductive layer and the principal surface of the viewing-side surface-defining element substrate; and the other principal surface of the second pressure-sensitive adhesive layer defined by the refractive index adjustment zone thereof is laminated to the antistatic layer.

33. The liquid crystal panel as recited in claim 30, wherein:

the transparent electroconductive layer is made of indium tin oxide, wherein the refractive index of the refractive index adjustment zone of the first pressure-sensitive adhesive layer is in the range of 1.60 to 1.80; and the antistatic layer is made of indium tin oxide, wherein the refractive indexes of the base pressure-sensitive adhesive material and the refractive index adjustment zone of the second pressure-sensitive adhesive layer are, respectively, in the range of 1.40 to 1.55 and in the range of 1.50 to 1.80.

\* \* \* \* \*